US011721275B2

(12) United States Patent
Kuwahara et al.

(10) Patent No.: US 11,721,275 B2
(45) **Date of Patent: *Aug. 8, 2023**

(54) OPTIMIZED DISPLAY IMAGE RENDERING

(71) Applicant: Intel Corporation, Santa Clara, CA (US)

(72) Inventors: Atsuo Kuwahara, Hillsboro, OR (US); Deepak S. Vembar, Portland, OR (US); Paul S. Diefenbaugh, Portland, OR (US); Vallabhajosyula S. Somayazulu, Portland, OR (US); Kofi C. Whitney, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/993,614

(22) Filed: Nov. 23, 2022

(65) Prior Publication Data

US 2023/0110339 A1 Apr. 13, 2023

Related U.S. Application Data

(63) Continuation of application No. 17/561,661, filed on Dec. 23, 2021, now Pat. No. 11,514,839, which is a (Continued)

(51) Int. Cl.

*G06F 3/12* (2006.01)
*G09G 3/20* (2006.01)

(Continued)

(52) U.S. Cl.

CPC ........... *G09G 3/2096* (2013.01); *G06F 3/012* (2013.01); *G06F 3/147* (2013.01);

(Continued)

(58) Field of Classification Search

CPC ......... G09G 2370/022; G09G 2370/16; G09G 2354/00; G09G 2320/0252;

(Continued)

(56) References Cited

U.S. PATENT DOCUMENTS

| | | | |
|---|---|---|---|
| 5,537,128 | A | 7/1996 | Keene et al. |
| 5,832,212 | A | 11/1998 | Cragun et al. |

(Continued)

OTHER PUBLICATIONS

U.S. Appl. No. 10/043,319, filed Aug. 7, 2018, Petrovskaya et al.

(Continued)

*Primary Examiner* — Lisa S Landis

(74) *Attorney, Agent, or Firm* — Hanley, Flight & Zimmerman, LLC

(57) ABSTRACT

In one example, a head mounted display system includes at least one memory; and at least one processor to execute instructions to: detect a first position and a first view direction of a head of a user based on sensor data generated by at least one of an accelerometer, at least one camera, or a gyroscope at a first point in time; determine a latency associated with a time to cause an image to be presented on the display; determine a predicted position and a predicted view direction of the head of the user at a second point in time based on the latency; render, prior to the second point in time, the image for presentation on the display based on the predicted position and the predicted view direction of the head of the user; and cause the display to present the rendered image.

28 Claims, 12 Drawing Sheets

Related U.S. Application Data continuation of application No. 17/133,265, filed on Dec. 23, 2020, now Pat. No. 11,210,993, which is a continuation of application No. 15/675,653, filed on Aug. 11, 2017, now Pat. No. 11,017,712.

(60) Provisional application No. 62/374,696, filed on Aug. 12, 2016.

(51) Int. Cl.
*G06F 3/01* (2006.01)
*G06F 3/147* (2006.01)

(52) U.S. Cl.
CPC ................. *G09G 2320/028* (2013.01); *G09G 2320/0252* (2013.01); *G09G 2320/0261* (2013.01); *G09G 2320/106* (2013.01); *G09G 2354/00* (2013.01); *G09G 2360/12* (2013.01); *G09G 2370/022* (2013.01); *G09G 2370/16* (2013.01)

(58) Field of Classification Search
CPC ..... G09G 2320/0261; G09G 2320/106; G09G 3/2096; G06F 3/012; G06F 3/147
See application file for complete search history.

(56) References Cited

U.S. PATENT DOCUMENTS 6,922,701 B1 7/2005 Ananian et al.
7,002,551 B2 2/2006 Azuma et al.
7,313,825 B2 12/2007 Redlich et al.
7,382,244 B1 6/2008 Donovan et al.
7,546,334 B2 6/2009 Redlich et al.
7,583,275 B2 9/2009 Neumann et al.
8,275,635 B2 9/2012 Stivoric et al.
8,452,080 B2 5/2013 Engedal
8,521,128 B1 8/2013 Welsh et al.
8,620,532 B2 12/2013 Curtis et al.
8,839,121 B2 9/2014 Bertolami et al.
8,933,931 B2 1/2015 Balan et al.
9,124,635 B2 9/2015 Robinson et al.
9,256,987 B2 2/2016 Ackerman et al.
9,304,970 B2 4/2016 Wirola et al.
9,595,083 B1 3/2017 Smith et al.
9,754,419 B2 9/2017 Petrovskaya et al.
9,916,002 B2 3/2018 Petrovskaya et al.
9,928,660 B1 3/2018 Vembar et al.
11,017,712 B2 5/2021 Kuwahara et al.
11,210,993 B2 12/2021 Kuwahara et al.
11,244,512 B2 2/2022 Vembar et al.
11,468,645 B2 10/2022 Petrovskaya et al.
11,514,839 B2 11/2022 Kuwahara et al.
11,542,870 B1 1/2023 Rambo
2002/0013675 A1 1/2002 Knoll et al.
2004/0107356 A1 6/2004 Shamoon et al.
2005/0132070 A1 6/2005 Redlich et al.
2006/0238380 A1 10/2006 Kimchi et al.
2006/0256110 A1 11/2006 Okuno et al.
2007/0035562 A1 2/2007 Azuma et al.
2008/0172201 A1 7/2008 Kotake et al.
2008/0195956 A1 8/2008 Baron et al.
2009/0047972 A1 2/2009 Neeraj
2009/0104585 A1 4/2009 Diangelo et al.
2009/0104686 A1 4/2009 Lee et al.
2009/0278917 A1 11/2009 Dobbins et al.
2010/0060632 A1 3/2010 Lefevre et al.
2010/0103196 A1 4/2010 Kumar et al.
2010/0164990 A1 7/2010 Van Doorn
2010/0166294 A1 7/2010 Marrion et al.
2010/0182340 A1 7/2010 Bachelder et al.
2010/0306825 A1 12/2010 Spivack
2011/0046925 A1 2/2011 Bidard et al.
2011/0102460 A1 5/2011 Parker
2011/0199479 A1 8/2011 Waldman
2011/0221771 A1 9/2011 Cramer et al.
2011/0286631 A1 11/2011 Wagner et al.
2011/0313779 A1 12/2011 Herzog et al.
2012/0105475 A1 5/2012 Tseng
2012/0197439 A1 8/2012 Wang et al.
2012/0249741 A1 10/2012 Maciocci et al.
2012/0315884 A1 12/2012 Forutanpour et al.
2012/0329486 A1 12/2012 Gits et al.
2013/0026224 A1 1/2013 Ganick et al.
2013/0042296 A1 2/2013 Hastings et al.
2013/0044130 A1 2/2013 Geisner et al.
2013/0101163 A1 4/2013 Gupta et al.
2013/0116968 A1 5/2013 Wirola et al.
2013/0117377 A1 5/2013 Miller
2013/0129230 A1 5/2013 Shotton et al.
2013/0132477 A1 5/2013 Bosworth et al.
2013/0132488 A1 5/2013 Bosworth et al.
2013/0174213 A1 7/2013 Liu et al.
2013/0176447 A1 7/2013 Nakashima
2013/0182891 A1 7/2013 Ling
2013/0222369 A1 8/2013 Huston et al.
2013/0242106 A1 9/2013 Leppanen et al.
2013/0286004 A1 10/2013 McCulloch et al.
2014/0002444 A1 1/2014 Bennett et al.
2014/0125699 A1 5/2014 Lotto et al.
2014/0189515 A1 7/2014 Waldman et al.
2014/0204077 A1 7/2014 Kamuda et al.
2014/0210710 A1 7/2014 Shin et al.
2014/0241614 A1 8/2014 Lee
2014/0254934 A1 9/2014 Laxminarayana Bhat et al.
2014/0267234 A1 9/2014 Hook et al.
2014/0276242 A1 9/2014 Chen et al.
2014/0292645 A1 10/2014 Tsurumi
2014/0307793 A1 10/2014 MacInnis
2014/0307798 A1 10/2014 Taubman et al.
2014/0323148 A1 10/2014 Schmalstieg et al.
2014/0324517 A1 10/2014 Harris
2014/0357290 A1 12/2014 Grabner et al.
2014/0368532 A1 12/2014 Keane et al.
2015/0046284 A1 2/2015 Hart
2015/0123993 A1 5/2015 Ohba et al.
2015/0143459 A1 5/2015 Molnar et al.
2015/0183465 A1 7/2015 Lee et al.
2015/0204676 A1 7/2015 Zhang et al.
2015/0206350 A1 7/2015 Gardes et al.
2015/0208072 A1* 7/2015 Chen .................... H04N 19/139 375/240.02
2015/0228114 A1 8/2015 Shapira et al.
2015/0234455 A1 8/2015 LaValle et al.
2015/0234462 A1 8/2015 Miller et al.
2015/0287246 A1 10/2015 Huston et al.
2015/0296170 A1 10/2015 Farrell et al.
2015/0309263 A2 10/2015 Abovitz et al.
2015/0317518 A1 11/2015 Fujimaki et al.
2015/0332439 A1 11/2015 Zhang et al.
2015/0348511 A1 12/2015 Oriol et al.
2015/0363976 A1 12/2015 Henson
2016/0026253 A1 1/2016 Bradski et al.
2016/0049008 A1 2/2016 Haddick et al.
2016/0080642 A1 3/2016 Jung et al.
2016/0098862 A1 4/2016 Wilson et al.
2016/0110560 A1 4/2016 Forte et al.
2016/0119536 A1 4/2016 Carceroni et al.
2016/0147064 A1 5/2016 Border et al.
2016/0180590 A1 6/2016 Kamhi et al.
2016/0189419 A1 6/2016 Fakih et al.
2016/0217623 A1 7/2016 Singh
2016/0260260 A1 9/2016 Fei et al.
2016/0282619 A1* 9/2016 Oto ......................... A63F 13/25
2016/0335275 A1 11/2016 Williams et al.
2016/0335497 A1 11/2016 Williams et al.
2016/0335802 A1 11/2016 Bradski
2016/0337599 A1 11/2016 Williams et al.
2016/0358485 A1 12/2016 Sommer et al.
2016/0360970 A1 12/2016 Tzvieli et al.
2017/0021273 A1 1/2017 Rios
2017/0123750 A1 5/2017 Todasco
2017/0201740 A1 7/2017 Gordon
2017/0276780 A1 9/2017 Takehara et al.

(56) References Cited

U.S. PATENT DOCUMENTS

| | | | |
|---|---|---|---|
| 2017/0293146 | A1 | 10/2017 | Nicholls et al. |
| 2017/0294044 | A1 | 10/2017 | Yerli |
| 2017/0374343 | A1 | 12/2017 | Boulton et al. |
| 2018/0004285 | A1 | 1/2018 | Castleman |
| 2018/0008141 | A1 | 1/2018 | Krueger |
| 2018/0047332 | A1 | 2/2018 | Kuwahara et al. |
| 2018/0075654 | A1 | 3/2018 | Vembar et al. |
| 2018/0165888 | A1 | 6/2018 | Duan et al. |
| 2018/0218543 | A1 | 8/2018 | Vembar et al. |
| 2018/0373320 | A1 | 12/2018 | Petrovskaya et al. |
| 2019/0139311 | A1 | 5/2019 | Petrovskaya et al. |
| 2019/0172410 | A1 | 6/2019 | Okumura |
| 2019/0179423 | A1 | 6/2019 | Rose et al. |
| 2019/0355050 | A1 | 11/2019 | Geisler et al. |
| 2020/0160609 | A1 | 5/2020 | Vembar et al. |
| 2021/0118357 | A1 | 4/2021 | Kuwahara et al. |
| 2021/0125415 | A1 | 4/2021 | Petrovskaya et al. |
| 2021/0350630 | A1 | 11/2021 | Petrovskaya et al. |
| 2022/0122516 | A1 | 4/2022 | Kuwahara et al. |

OTHER PUBLICATIONS

U.S. Appl. No. 10/504,291, filed Dec. 10, 2019, Petrovskaya et al.
U.S. Appl. No. 10/573,079, filed Feb. 25, 2020, Vembar et al.
U.S. Appl. No. 10/832,488, filed Nov. 10, 2020, Petrovskaya et al.
Petrovskaya, "Towards Dependable Robotic Perception," PhD Thesis, Jun. 2011, retrieved from (http://cs.stanford.edu/people/petrovsk/dn/publications/anva-thesis.pdf) 226 pages.
Curless et al., "A Volumetric Method for Building Complex Models From Range Images," in proceedings of the 23rd annual conference on Computer Graphics and Interactive Techniques, pp. 303-312, ACM, 1996, 10 pages.
Lorensen et al., "Marching Cubes: A High Resolution 3D Surface Construction Algorithm," ACM Siggraph Computer Graphics, vol. 21, pp. 163-169, 1987, 7 pages.
International Searching Authority, "International Search Report & Written Opinion," mailed in connection with International Patent Application No. PCT/US2015/60744, dated Feb. 2, 2016, 8 Pages.
United States Patent and Trademark Office, "Notice of Allowance and Fee(s) Due," mailed in connection with U.S. Appl. No. 15/406,652, dated Apr. 27, 2018, 10 pages.
United States Patent and Trademark Office, "Non-final Office Action," mailed in connection with U.S. Appl. No. 15/406,652, dated Oct. 6, 2017, 22 pages.
United States Patent and Trademark Office, "Final Office Action," mailed in connection with U.S. Appl. No. 16/034,275, dated Jun. 11, 2019, 19 pages.
United States Patent and Trademark Office, "Non-final Office Action," mailed in connection with U.S. Appl. No. 16/034,275, dated Mar. 8, 2019, 4 pages.
United States Patent and Trademark Office, "Notice of Allowability," mailed in connection with U.S. Appl. No. 16/051,099, dated Sep. 30, 2019, 8 pages.
United States Patent and Trademark Office, "Notice of Allowance and Fee(s) Due," mailed in connection with U.S. Appl. No. 16/051,099, dated Aug. 7, 2019, 11 pages.
United States Patent and Trademark Office, "Non-final Office Action," mailed in connection with U.S. Appl. No. 16/051,099, dated Jan. 25, 2019, 4 pages.
United States Patent and Trademark Office, "Non-final Office Action," mailed in connection with U.S. Appl. No. 16/706,108, dated Mar. 10, 2020, 8 pages.
United States Patent and Trademark Office, "Notice of Allowance and Fee(s) Due," mailed in connection with U.S. Appl. No. 16/706,108, dated Jul. 8, 2020, 9 pages.
United States Patent and Trademark Office, "Non-final Office Action," mailed in connection with U.S. Appl. No. 16/749,501, dated Dec. 10, 2020, 24 pages.
United States Patent and Trademark Office, "Notice of Allowance and Fee(s) Due," mailed in connection with U.S. Appl. No. 15/262,369, dated Nov. 13, 2017, 7 pages.
United States Patent and Trademark Office, "Non-final Office Action," mailed in connection with U.S. Appl. No. 15/937,649, dated Apr. 4, 2019, 14 pages.
United States Patent and Trademark Office, "Final Office Action," mailed in connection with U.S. Appl. No. 15/937,649, dated Aug. 16, 2019, 11 pages.
United States Patent and Trademark Office, "Notice of Allowance and Fee(s) Due," mailed in connection with U.S. Appl. No. 15/937,649, dated Oct. 17, 2019, 7 pages.
United States Patent and Trademark Office, "Non-Final Office Action," mailed in connection with U.S. Appl. No. 15/675,653, dated Sep. 17, 2018, 10 pages.
United States Patent and Trademark Office, "Final Office Action," mailed in connection with U.S. Appl. No. 15/675,653, dated Jan. 10, 2019, 12 pages.
United States Patent and Trademark Office, "Non-final Office Action," mailed in connection with U.S. Appl. No. 15/675,653, dated Aug. 10, 2020, 14 pages.
United States Patent and Trademark Office, "Non-Final Office Action," mailed in connection with U.S. Appl. No. 16/749,501, dated Dec. 10, 2020, 23 pages.
United States Patent and Trademark Office, "Notice of Allowance and Fee(s) Due," mailed in connection with U.S. Appl. No. 15/675,653, dated Feb. 18, 2021, 7 pages.
United States Patent and Trademark Office, "Final Office Action," mailed in connection U.S. Appl. No. 16/749,501, dated May 11, 2021, 23 pages.
United States Patent and Trademark Office, "Advisory Action," mailed in connection with U.S. Appl. No. 16/749,501, dated Aug. 26, 2021, 2 pages.
United States Patent and Trademark Office, "Notice of Allowance and Fee(s) Due," mailed in connection with U.S. Appl. No. 17/133,265, dated Aug. 30, 2021, 11 pages.
United States Patent and Trademark Office, "Non Final Office Action," issued in connection with U.S. Patent Application No. 17/094,138, dated Aug. 11, 2021, 9 pages.
United States Patent and Trademark Office, "Notice of Allowability," issued in connection with U.S. Appl. No. 17/133,265, dated Sep. 9, 2021, 2 pages.
United States Patent and Trademark Office, "Notice of Allowance and Fee(s) Due," mailed in connection with U.S. Appl. No. 16/749,501, dated Oct. 1, 2021, 12 pages.
United States Patent and Trademark Office, "Final Office Action," mailed in connection with U.S. Appl. No. 17/094,138, dated Jan. 31, 2022, 6 pages.
United States Patent and Trademark Office, "Notice of Allowance and Fee(s) Due," mailed in connection with U.S. Appl. No. 17/094,138, dated May 9, 2022, 9 pages.
United States Patent and Trademark Office, "Corrected Notice of Allowability," issued in connection with U.S. Appl. No. 17/133,265, dated Oct. 18, 2021, 2 pages.
United States Patent and Trademark Office, "Notice of Allowance," issued in connection with U.S. Appl. No. 15/054,082, dated Jan. 19, 2018, 8 pages.
United States Patent and Trademark Office, "Notice of Allowability," issued in connection with U.S. Appl. No. 15/054,082, dated Dec. 29, 2017, 5 pages.
United States Patent and Trademark Office, "Final Office Action," issued in connection with U.S. Appl. No. 15/054,082, dated May 4, 2017, 12 pages.
United States Patent and Trademark Office, "Non-final Office Action," issued in connection with U.S. Appl. No. 15/054,082, dated Dec. 9, 2016, 9 pages.
United States Patent and Trademark Office, "Non-final Office Action," mailed in connection with U.S. Appl. No. 15/879,717, dated Feb. 21, 2019, 11 pages.
United States Patent and Trademark Office, "Final Office Action," mailed in connection with U.S. Appl. No. 15/879,717, dated Sep. 16, 2019, 12 pages.

(56) References Cited

OTHER PUBLICATIONS

United States Patent and Trademark Office, "Non-final Office Action," mailed in connection with U.S. Appl. No. 15/879,717, dated Apr. 24, 2020, 12 pages.
United States Patent and Trademark Office, "Final Office Action," mailed in connection with U.S. Appl. No. 15/879,717, dated Oct. 19, 2020, 13 pages.
United States Patent and Trademark Office, "Non-final Office Action," mailed in connection with U.S. Appl. No. 15/879,717, dated Aug. 3, 2021, 12 pages.
United States Patent and Trademark Office, "Final Office Action," mailed in connection with U.S. Appl. No. 15/879,717, dated Mar. 15, 2022, 19 pages.
United States Patent and Trademark Office, "Notice of Allowance and Fee(s) Due," issued in connection with U.S. Appl. No. 17/561,661, dated Aug. 9, 2022, 8 pages.
United States Patent and Trademark Office, "Non-Final Office Action", issued in connection with U.S. Appl. No. 17/384,293, dated Feb. 16, 2023, 15 pages.
United States Patent and Trademark Office, "Corrected Notice of Allowability," mailed in connection with U.S. Appl. No. 17/094,138, dated Jun. 13, 2022, 2 pages.
United States Patent and Trademark Office, "Supplemental Notice of Allowability," mailed in connection with U.S. Appl. No. 17/094,138, dated Aug. 24, 2022, 8 pages.

* cited by examiner

1000

1100

OPTIMIZED DISPLAY IMAGE RENDERING

RELATED APPLICATIONS

This patent arises from a continuation of U.S. patent application Ser. No. 17/561,661, (now U.S. Pat. No. 11,514, 839), filed on Dec. 23, 2021, which is a non-provisional application claiming priority to U.S. patent application Ser. No. 17/133,265, (now U.S. Pat. No. 11,210,933), filed on Dec. 23, 2020, which is a non-provisional application claiming priority to U.S. patent application Ser. No. 15/675,653, (now U.S. Pat. No. 11,017,712), filed on Aug. 11, 2017, which is a non-provisional application claiming priority to U.S. Provisional Patent Application No. 62/374,696, filed on Aug. 12, 2016. Priority is claimed to U.S. Patent Application No. 17/561,661, U.S. patent application Ser. No. 17/133, 265, U.S. patent application Ser. No. 15/675,653, and U.S. Provisional Patent Application No. 62/374,696. U.S. patent application Ser. No. 17/561,661, U.S. patent application Ser. No. 17/133,265, U.S. patent application Ser. No. 15/675, 653, and U.S. Provisional Patent Application No. 62/374, 696 are incorporated herein by reference in their entireties.

TECHNICAL FIELD

This disclosure relates generally to rendering display images.

BACKGROUND

In head mounted display (HMD) systems such as Virtual Reality (VR) and/or Augmented Reality (AR) systems, there is typically latency between when an image is rendered for viewing and when the user views a rendered image displayed on the head mounted display. This latency can be due, for example, to movement of the user's head between the image rendering and the actual display on the HMD.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Head mounted displays (HMDs) are becoming more affordable and available to users (for example, in mainstream personal computer form-factors). In some embodiments, an optimal and differentiated user experience for users wearing HMDs is made available. Some embodiments relate to optimization of display image rendering, predictive display rendering, and/or predictive image rendering, etc.

In some embodiments, head mounted display systems minimize latencies such as motion latencies. Some embodiments relate to optimizing time warping for Head-Mounted Displays (HMDs). Time warping is a method in which a large rendered image target is prepared and content to be displayed on the HMD is adjusted to account for the delta (or difference) in the field of view (FOV) due to head movement of a user of the HMD between the time that the target image is rendered and when it is actually displayed on the HMD. As a result, excess image data can be generated for the rendering, and then not actually rendered in the displayed image due to the head movement. However, the extra generated image data that is not actually rendered can represent wasted power and memory resources. Therefore, in some embodiments, a system can limit extra generated image data while still providing enough image data to make sure that rendered image data is available for display on the HMD.

Figure 1:
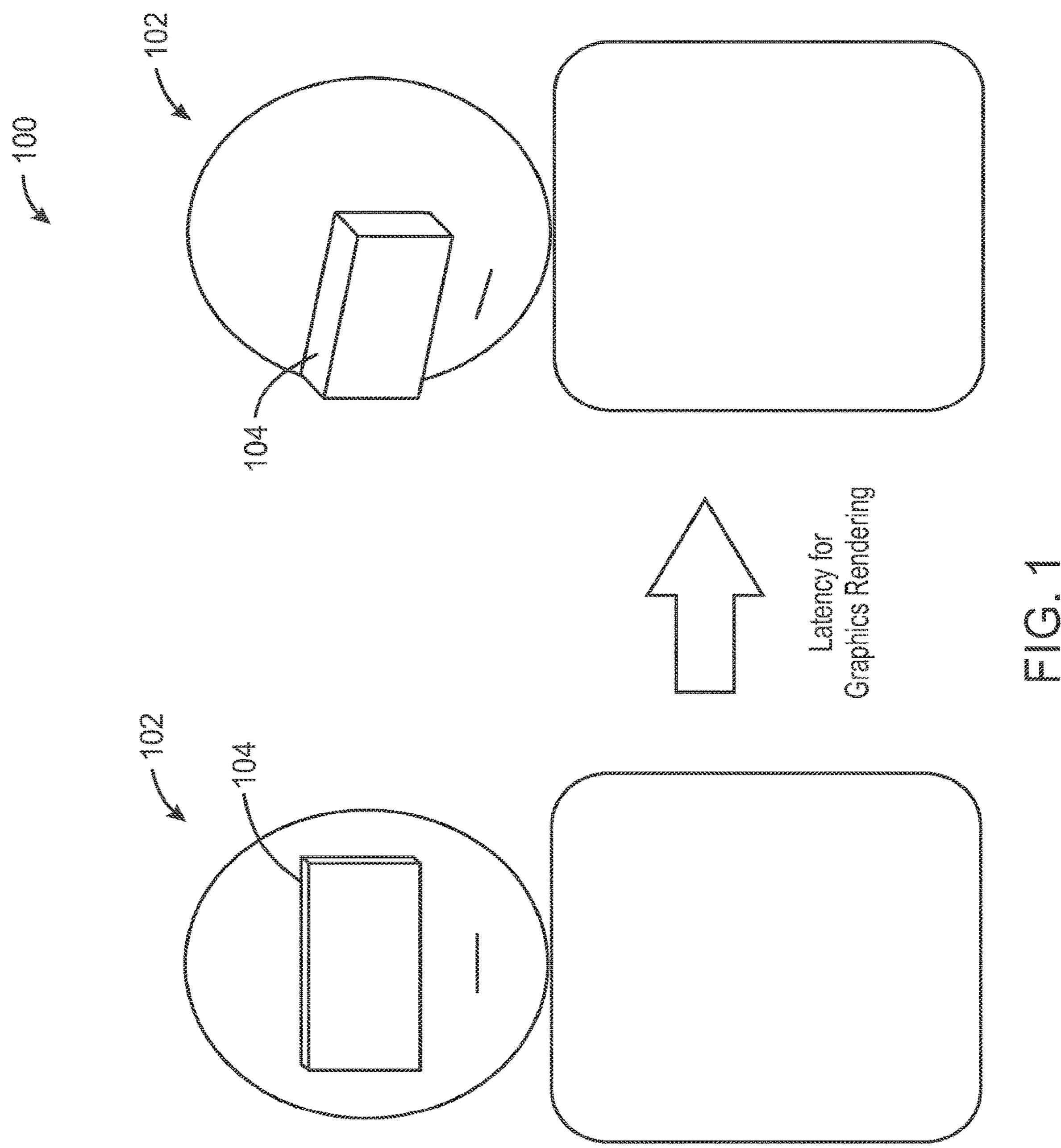
FIG. 1 illustrates a user wearing a head mounted display.

FIG. 1 illustrates an example 100 of a user 102 wearing a head mounted display (HMD) 104. On the left side of FIG. 1, the user 102 is in a current position looking forward. On the right side of FIG. 1, the same user 102 is shown wearing the head mounted display 104 as the user 102 is looking to a display position to the right of the user 102 (which appears to the left when looking at user 102 in FIG. 1) a delayed and/or short time after that same user 102 was looking forward. A head mounted display system will have some latency for graphics rendering between the time the user 102 is looking forward (for example, at a time of image rendering) and the time that same user 102 is looking slightly to the right at a short time later (for example, at a time of display of a rendered image on the head mounted display 104). FIG. 1 illustrates the concept of a shifted view rendered on the head mounted display 104, based on motion of the head of the user 102 in a short timeframe between when the image is initially rendered and when that image is able to be displayed on the head mounted display 104 for the user 102 to view. For example, if the user 102 quickly rotates their head, depending on the latency of a graphics rendering pipe and/or a large distance movement of the user's head between when the image is rendered and when it is displayed, a needed adjustment could be very large. If a large latency is introduced in a graphics pipe (for example, due to the complexity of the content being rendered), additional large latency can be introduced into the graphics pipe. For media content, for example, the processor may take a longer time to decode a very high resolution video than in a situation where a simple video is rendered at low resolution. Any extra time taken to place the resulting frame in the render target adds to the overall latency. If an increased latency is introduced, for example in an interface between a host system and an HMD, the overall latency is further increased. For example, if a host device and an HMD are wirelessly connected, and/or if the image render processing is implemented in the cloud, additional interface latencies can occur.

Figure 2:
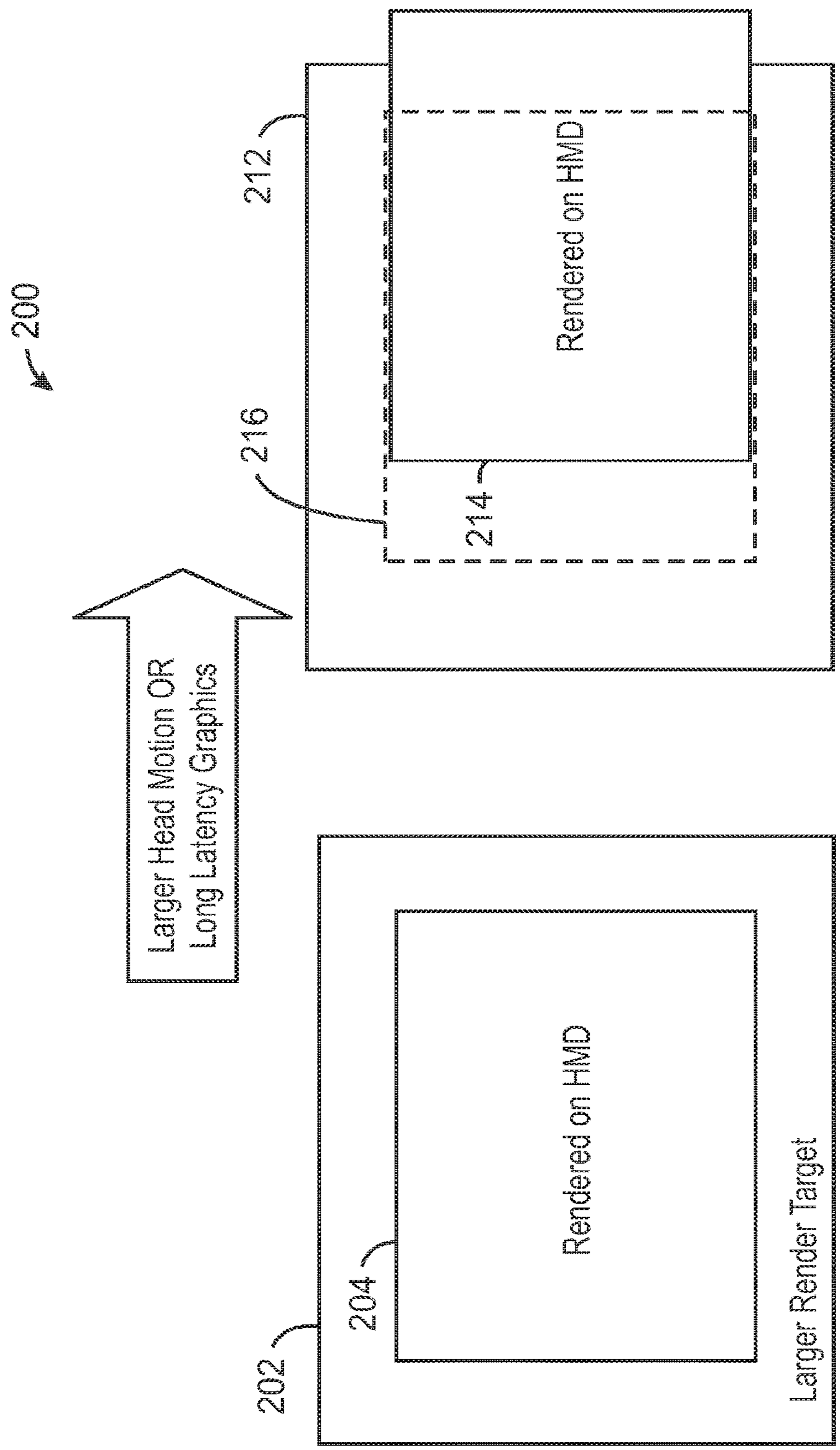
FIG. 2 illustrates display rendering.

FIG. 2 illustrates a graphic block diagram 200 illustrating display rendering. As illustrated in FIG. 2, block 202 shows a frame in which a large rendered target is shown in block 204. The rendered target 204 can be an image rendering for display on a head mounted display (HMD), for example. At a time shortly after the initial rendering at 204, block 212 shows a frame with an actual rendering 214 on the head mounted display. According to some embodiments, actual rendered image 214 can be adjusted (for example, using a time warp implementation). The adjustment is made from the initial rendering 204, which is also shown as initial rendering 216 in dotted lines in FIG. 2 for comparison purposes.

As illustrated in FIG. 2, a problem can occur where a large head motion or long latencies in the image display path can result in a lack of information required to display the contents based on the new field of view (FOV). This is illustrated, for example, by the portion of rendered image 214 that extends beyond the frame 212. Such a large motion or long latency in the graphics pipeline can result in the HMD not having all of the correct image data to display on the HMD. However, according to some embodiments, these types of issues can be avoided.

In some embodiments, the types of problems described herein may be overcome by optimizing a rendered image target by estimating the expected FOV at the time of display on the HMD. This is based on understanding the latency associated with displaying the rendered target image and estimating a head pose (and/or a head position) based on sensor data relating to the HMD. In some embodiments, for example, head mounted display sensors and/or peripheral sensors may be used to detect head movement at one or more times near the time of rendering and/or the time of display.

Time warping is a method by which a large rendered target is prepared and content is displayed on a head mounted display in a manner such that it is adjusted to account for the change in the field of view (FOV). This change is the FOV is due to head movement between the time that the rendered target was prepared and the time that it is actually displayed on the head mounted display, for example. In order to ensure that enough image rendering information is available for display, a larger image than necessary for the current image can be rendered at block 204 (for example 1.4 times what is necessary in order to render the current image). This larger size rendering allows the correct image data to be available to be rendered on the head mounted display at a later time based on a potential change in the head motion of the user of the head mounted display (that is, in order to account for the latency). Therefore, in some embodiments, a larger image can be rendered at block 204. The larger rendered image 204 can be transmitted to the head mounted display, with some latency associated with the head movement and/or additional latency associated with transmission of the rendered image to the head mounted display. In the time that is taken to transmit the image to the head mounted display, the user may have moved their head. Therefore, the user is then looking at an image that is slightly skewed from what was initially rendered at 204. Since a bigger frame buffer can be rendered at 204 and transmitted to the head mounted display, additional image information can then be available at the time of display on the head mounted display. However, there can be data that is rendered at 204 that is not necessary for the user to view at the later time, since the image has changed slightly due to movement of the user's head. If the direction that the user's head is moving between the time of the rendering at 204 and the image at 214 can be predicted, a more accurate assessment can be made of the image needed to be rendered for the user to see the updated image information correctly.

In some embodiments, an HMD can be used which includes integrated motion sensors to track the movement of the HMD device. For example, in some embodiments, an HMD can include inertia motion sensors. In some embodiments, external cameras facing toward the device may be used to track positional information (including position and orientation of the HMD, for example). According to some embodiments, data from these sensors can be used to determine the field of view (FOV) of the user and render the appropriate content on the display of the HMD. Data from these types of sensors can be used in some embodiments to predict and effectively make use of an image rendering buffer area to ensure that proper data to be displayed is available in the render target memory at the HMD. Some embodiments may result in a better user experience, optimized memory usage, and/or better power efficiency.

In some embodiments, available head motion information can be used to predict future head poses (and/or head positions) and to adjust the render target accordingly.

In some embodiments, time warping can be used to render more data into a render target buffer than what is actually necessary for display on the HMD. This can be implemented in a manner similar to digital stabilization used for cameras. In some embodiments, an image rendering target buffer is efficiently used to minimize the risk of not having available the proper content to display due to heavy motion and/or latencies in the rendering pipeline. According to some embodiments, prediction (or projection) of the image position and/or orientation at a point when an image will be displayed on the HMD allows a reduction in the necessary amount of data that is rendered but not displayed, which can allow better power efficiency.

Figure 3:
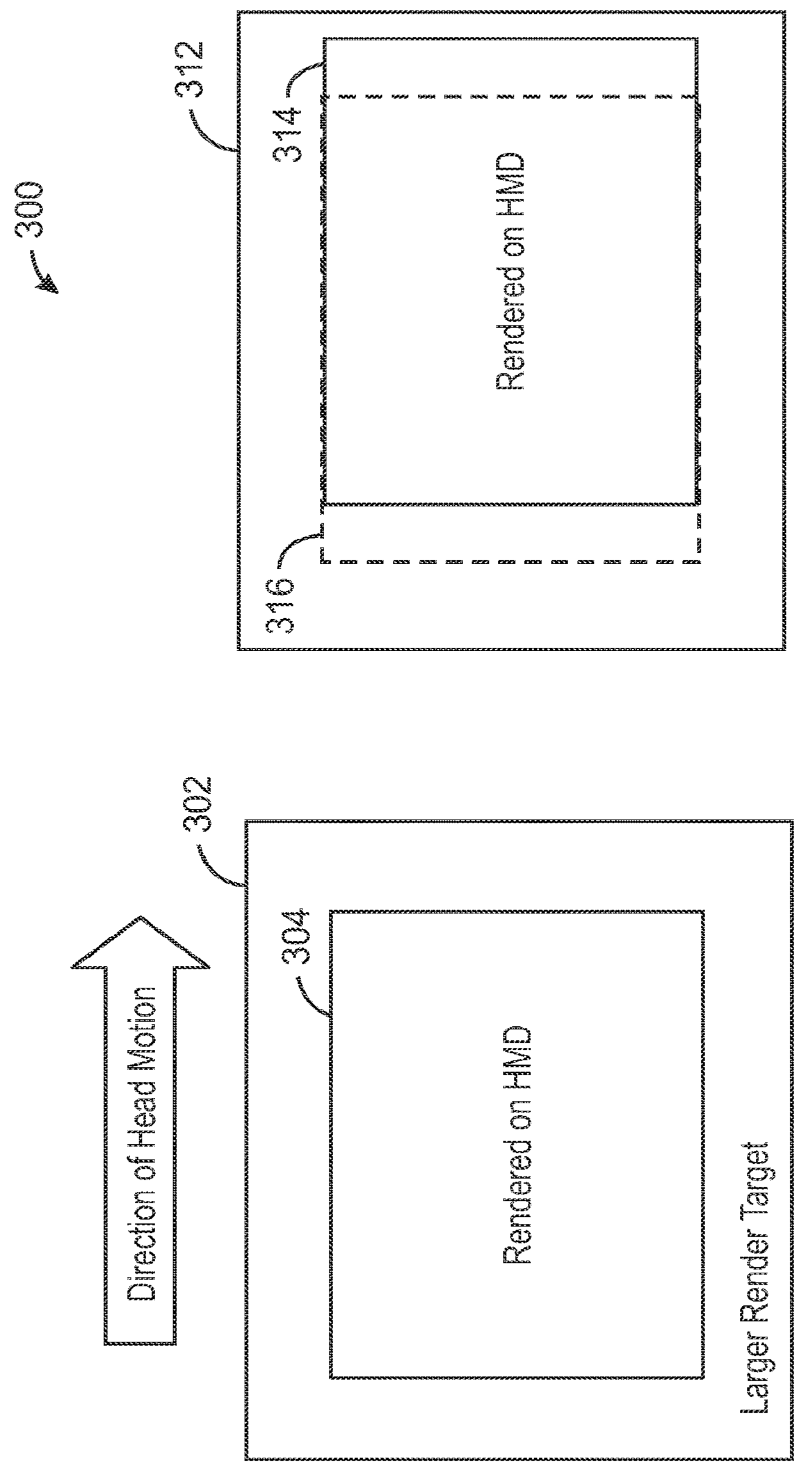
FIG. 3 illustrates display rendering.

FIG. 3 is a graphic block diagram 300 illustrating display rendering. As illustrated in FIG. 3, block 302 shows a frame in which a larger render target image 304 to be displayed on a head mounted display (HMD) is initially rendered. At a time shortly after the initial rendering, frame 312 shows an actual image rendering 314 on the head mounted display that is to be adjusted in a time warp implementation from the initial rendering 316 shown in dotted lines in FIG. 3. In some embodiments, FIG. 3 can illustrate a situation where the user's head is turned very quickly and/or there is a long graphics latency associated with the image rendering or transmission that is too large. In such a situation, the rendered image 314 may adjust too far, such that the correct data is not available for displaying the appropriate image at that time. That is, the desired image is not actually rendered, so there is tearing, visual artifacts, etc. In order to prevent this problem, it is desirable to take into account the direction of what the head mounted display user is looking at (for example, the direction of movement of the user's head), as well as the direction of motion, speed of motion, and/or the latency of motion. In this manner, according to some embodiments, the amount of memory may be optimized and some of the work done to render a larger frame buffer image may also be minimized. In some embodiments, a frame buffer image rendering may be done in an advantageous manner in order to account for latency in the pipeline, latency due to transmission of the rendered image to the head mounted display, latency in the sampling, and/or latency in actually rendering out the image to show the correct head mounted display image.

In some embodiments, head motion of a user is predicted (for example, based on sampling). For example, in a head mounted display that is running at 90 Hertz rather than 30 Hertz, the head mounted display can sample head motion of a user once every 10 milliseconds. This sampling can be used in order to more accurately predict where the head is going to be at a desired display time (for example, in 10 milliseconds). In some embodiments, time warp may be used in addition to prediction of where the head will be in the future (for example in 10 ms) in order to save power, save memory, and make sure that the entire image is available to be rendered properly at the right time. In some embodiments, the prediction may occur within the head mounted display. In some embodiments, the prediction may occur somewhere else (for example in a host system, a cloud, etc.) In some embodiments, the prediction may occur in a combination of the head mounted display and somewhere else (such as in a host system, a cloud, etc.)

It is noted that FIGS. 1, 2 and 3, for example, can illustrate head motion of a user in a particular direction such as a horizontal direction. However, in some embodiments, head motion can occur in a variety of directions, motions, etc. The drawings and description herein should not be limited to illustrate head motion changes in only a horizontal direction. For example, in some embodiments head motion can occur in a vertical direction or in a combination of horizontal and vertical directions, for example. According to some embodiments, head motion of a user is predicted in any direction and is not limited to prediction of head motion in a horizontal manner. That is, even though time warp can occur due to a motion of the user in a horizontal direction, it is noted that in some embodiments, time warp can occur when motion of a user occurs in a variety of directions.

Figure 4:
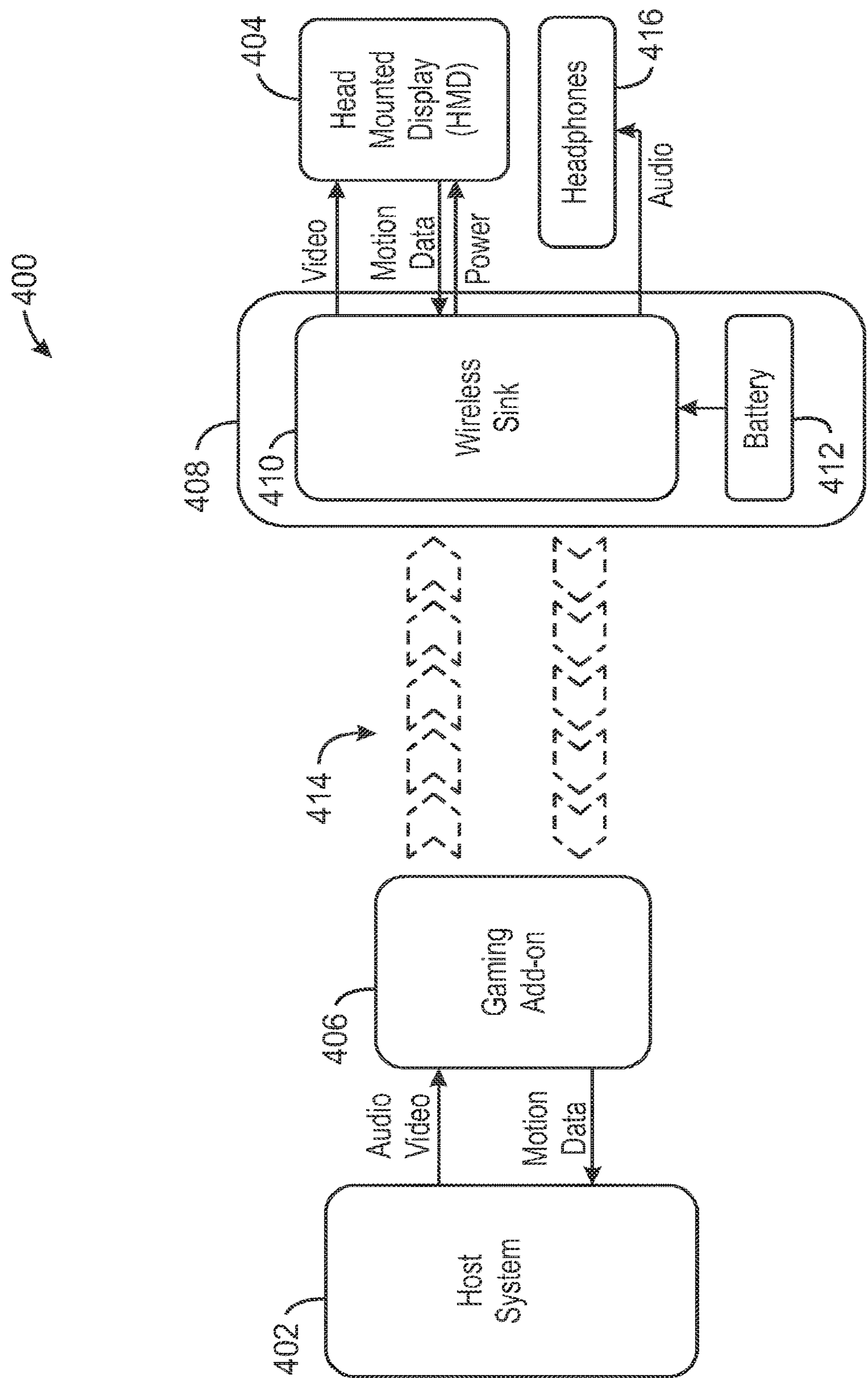
FIG. 4 illustrates a head mounted display system.

FIG. 4 illustrates a system 400 including a host system 402 (for example, a Virtual Reality ready desktop system) and a head mounted display (HMD) 404. System 400 additionally can include a gaming add-on 406 (for example, an Intel® WiGig Gaming Add-on device), a wireless transceiver 408 that includes a wireless sink 410 (for example, an Intel® Wireless Gigabit Sink) and a battery 412, as well as headphones 416 that can be used by a user in conjunction with the head mounted display 404. Gaming Add-on 406 and wireless transceiver 408 allow the host system 402 and the head mounted display 404 to communicate with each other via a wireless connection 414. In some embodiments, audio and/or video as well as motion data may be transmitted via the gaming add-on 406 to and from the host 402. In some embodiments, video, power, and/or motion data may be transmitted to and from the head mounted display 404 via the wireless transceiver 408. The wireless transceiver 408 may also be used to transmit audio data to headphones 416.

Figure 5:
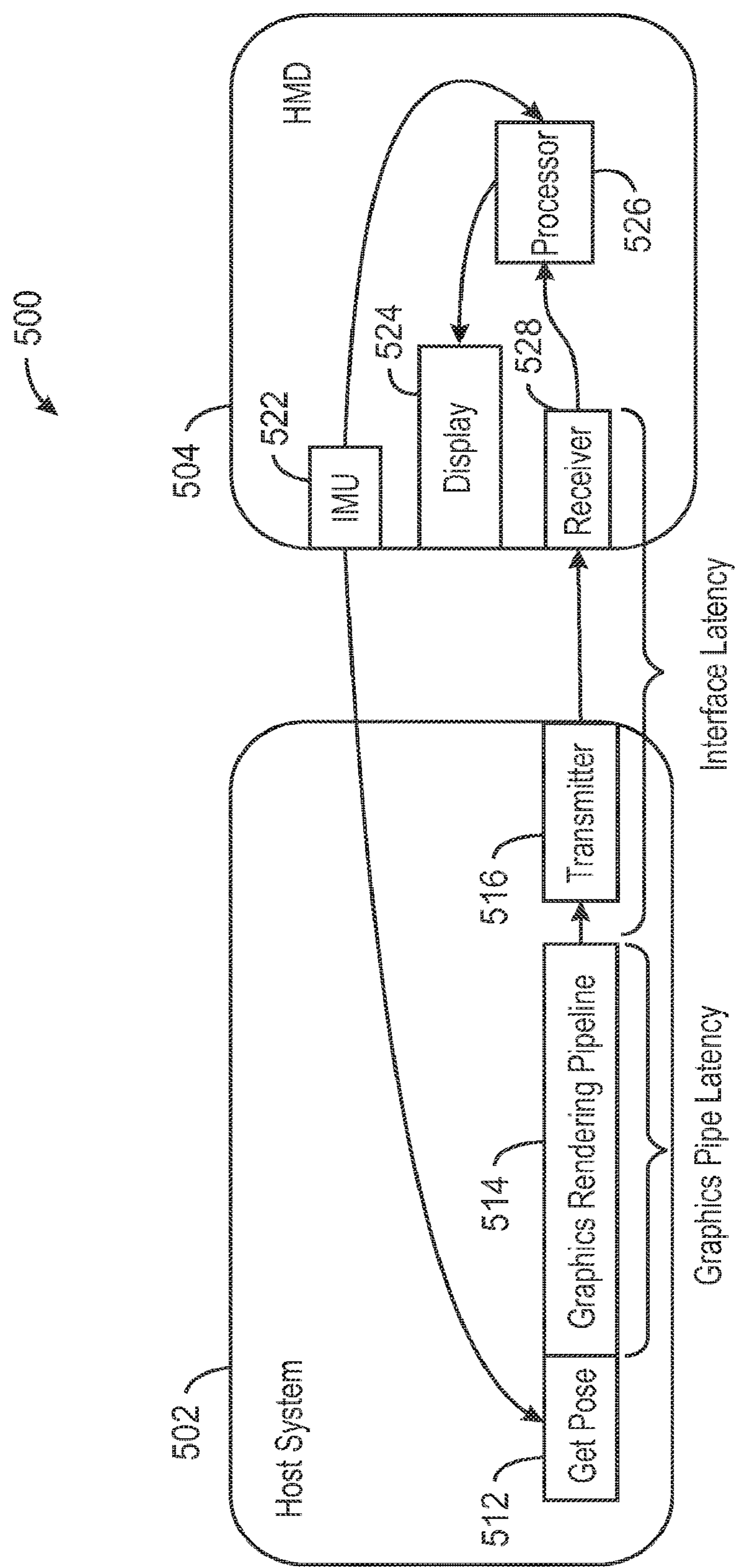
FIG. 5 illustrates a head mounted display system.

FIG. 5 illustrates a system 500 including a host system 502 and a head mounted display (HMD) 504. Host system 502 includes a processor (for example, using a CPU) that can implement a get pose (and/or get head position) operation 512, a graphics processor that can implement a graphics rendering pipeline 524, and a transmitter 516. It is noted that in some embodiments transmitter 516 is a transceiver, allowing transmit and receive operations to and from the host 502. HMD 504 includes an IMU (and/or Inertial Magnetic Unit and/or Inertial Measurement Unit) 522, a display 524, a processor 526, and a receiver 528. It is noted that in some embodiments receiver 528 is a transceiver, allowing transmit and receive operations to and from the HMD 504. IMU 522 can be a sensor, an Inertial Magnetic Unit, and/or an Inertial Measurement Unit used to obtain information about the head mounted display (for example head position and/or head orientation). In some embodiments, IMU 522 is an inertia motion sensor. For example, in some embodiments, IMU 522 includes one or more accelerometers, one or more gyroscopes, etc.

FIG. 5 is used to illustrate how, in some embodiments, latencies in the graphics rendering pipeline 514 and/or latencies in the interface including transmitter 516 and receiver, for example, can affect the overall time from the initial estimated pose (and/or estimated head position) to when an adjustment is made by processor 526 (for example, using time warp technology and/or predictive pose and/or predictive head position) and displayed at the display 524.

When implementing graphics rendering, the system is trying to figure out where the user is located (and/or oriented) in order to render the correct image (for example, where the user is, and what the user is looking at, which is fundamentally the view direction). Therefore, get pose (and/or get head position) block 512 can typically be implemented in a processor such as a central processor or CPU, and can work to obtain where the user is in space, and what direction the user is looking. This can be passed along with all the 3-D geometry data to the graphics rendering pipeline 514. In some embodiments, the graphics rendering pipeline 514 takes all the graphics, the models, the texture, the lighting, etc. and generates a 3-D image scene. This 3-D scene is generated based on the particular head position and view direction obtained by the get pose (and/or get head position) block 512 via the IMU 522. There can be a graphics pipe latency associated with obtaining the pose (and/or head position) 512 and rendering the graphics pipeline 514. There can also be additional latency associated with transmitting the rendered image via transmitter 516 of the host system 502 and receiving it at receiver 528 of the head mounted display 504 (that is, the interface latency). Processor 526 can implement a time warp and/or prediction of head position and/or view information sampled from IMU 522.

In some embodiments, processor 526 is used to implement adjustment for time warp and/or predictive projected position of the rendered display from the graphics rendering pipeline 514 based on additional information from the IMU 522 based on predicting how the user has moved their head since the original pose (and/or head position) was taken by the host processor at 512.

In some embodiments, the processor 526 of the head mounted display 504 is used to provide prediction and/or time warp processing. In some embodiments, the processor 526 samples the IMU 522. In some embodiments, the host system 502 samples the IMU 522. In some embodiments, the prediction could occur in one or more processor in the host system (for example, in one or more processor that includes get pose (and/or head position) 512 and/or graphics rendering pipeline 514). In some embodiments, the sampled information from IMU 522 is used by a processor in the host system 502 to implement the image rendering. In some embodiments, the rendering may occur in the host system 502, and in some embodiments the rendering may occur in the head mounted display 504. In some embodiments, the rendering may occur across both the host system 502 and the head mounted display 504. In some embodiments, predictive tracking is implemented to save power and efficiency. In some embodiments, one or more processor in the host system 502 (for example, a graphics processor performing the graphics rendering 514) is preempted in order to provide the predictive tracking. While the graphics rendering pipeline 514 within a processor in the host system 502 is illustrated in FIG. 5, it is understood that graphics rendering may also be implemented in the head mounted display 504 according to some embodiments.

In some embodiments, the initial latency based on obtaining the pose (and/or head position) at 512 and rendering the image at 514 is approximately 30 to 35 ms. However, the additional interface latency associated with transmitting from transmitter 516 to receiver 528 may add another approximately 50 or 60 ms in some embodiments.

In some embodiments, every reading from IMU 522 is time stamped so that exact times of each sampling is known by one or more processor(s) of the host system 502 and/or by the processor 526 of the head mounted display 504. In this manner, exact times of receipt of the pose (and/or head position) information from the IMU 522 is known. This allows for prediction and time warp operations that are based on known sampling information from IMU 522. This is helpful, for example, in cases where graphics pipe latency and/or interface latency is different at different times. In some embodiments, processor 526 takes various sampling information from IMU 522, and is able to provide better predictive and/or time warp adjustments based on the received information and timestamp from the IMU (that is, pose and/or head position information initially received at get pose 512 and additional sampling directly from the IMU 522). Once the correct adjustments are made, a better predictive and/or time warp rendered image is able to be provided from processor 526 to the display 524 of the head mounted display 504.

In some embodiments, image rendering is implemented based on a pose (and/or head position) of a user's head. Pose (and/or head position) can be obtained by sensors such as one or more cameras and/or an IMU (for example, in some embodiments from sensors such as accelerator(s) and/or gyroscope(s)), and the input data is used to render an image scene for display on the HMD. Rendering of such an image scene will take a certain amount of time, which in some embodiments is a known predetermined amount of time, and in some embodiments is a dynamic amount of time. The rendered scene is displayed on the HMD screen (for example, display 524) which takes more time.

For example, if rendering an image scene and displaying it on an HMD takes 30 ms, within that 30 ms the head of the user could have moved quite a bit, such that the obtained data (for example, from the IMU) that was used to render the scene from a particular position and/or orientation has become stale. However, the HMD can sample the data again (for example, sample the IMU 522 using the processor 526) before displaying it on display 526, and perform a two dimensional (2 D) transform on the rendered data using processor 526 in order to account for the intermediate head motion. As discussed herein, this can be referred to as time warping.

Figure 6:
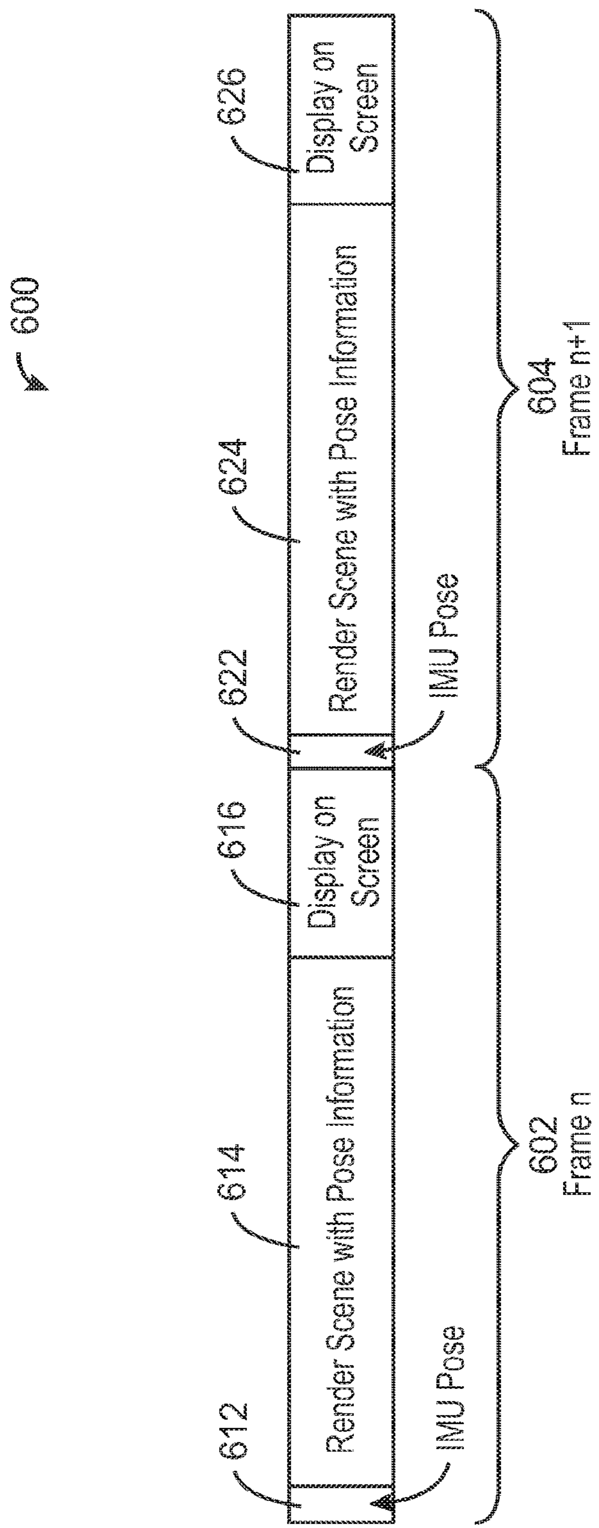
FIG. 6 illustrates display rendering.

FIG. 6 illustrates display rendering frames 600, including display rendering frame n (602) and display rendering frame n+1 (604). FIG. 6 illustrates a situation where the pose (and/or head position) 612 (in frame n 602) is received from the IMU, and the image scene is rendered with the pose (and/or head position) information at 614. For example, in some embodiments a larger image scene is rendered at 614 similar to that described in reference to FIG. 2 and/or FIG. 3 above. It is then displayed at 616. Similarly, the pose (and/or head position) 622 (in frame n+1 604) is received from the IMU, and the image scene is rendered with the pose (and/or head position) information at 624. For example, in some embodiments a larger image scene is rendered at 624 similar to that described in reference to FIG. 2 and/or FIG. 3 above. It is then displayed at 626. In the example illustrated in FIG. 6, the system is not taking account for latency in the graphics pipeline or in the transmission from the host to the head mounted display. It is also not taking into account the rate of motion. Additionally, the example of FIG. 6 does not take into account the sampling itself of the IMU. The example illustrated in FIG. 6 does not perform any adjustment for time warp or for prediction of the position or orientation of the user.

Figure 7:
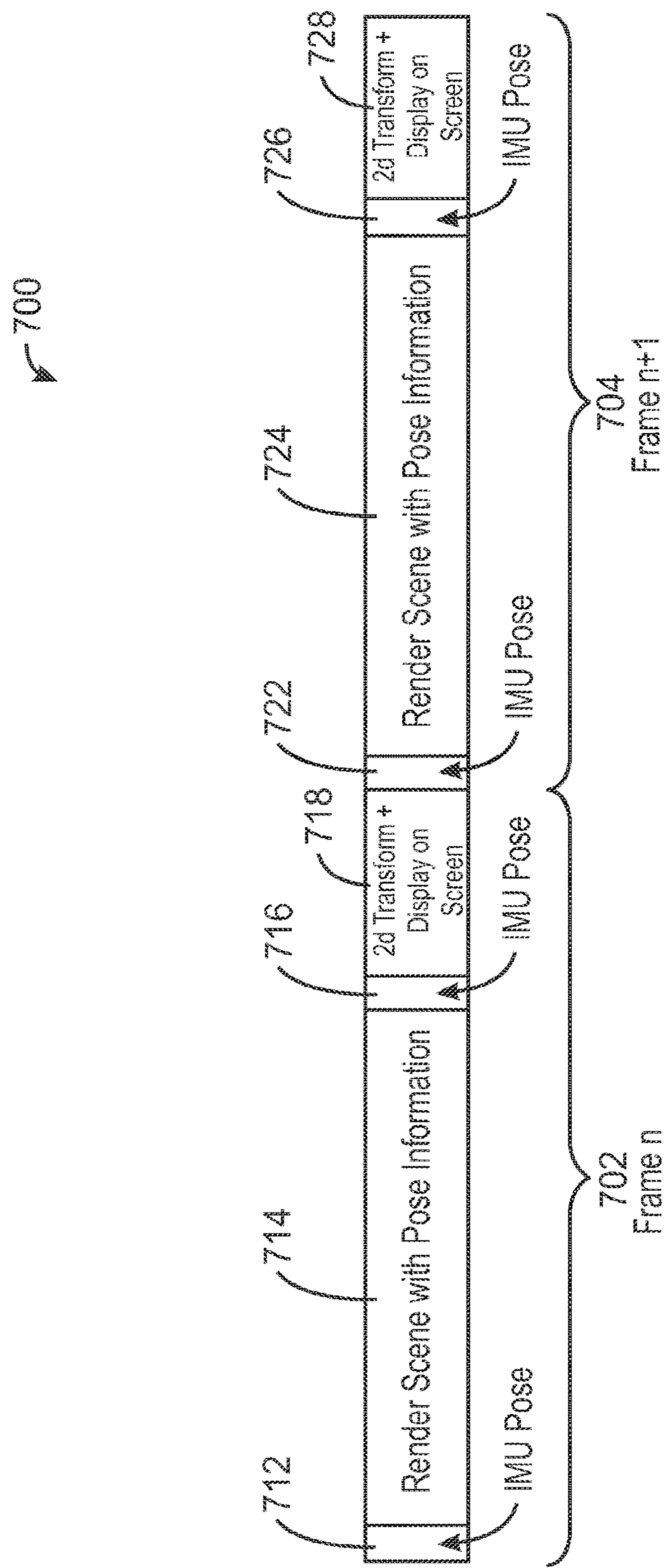
FIG. 7 illustrates display rendering.

FIG. 7 illustrates display rendering frames 700, including display rendering frame n (702) and display rendering frame n+1 (704). FIG. 7 illustrates a situation where the pose (and/or head position) 712 (in frame n 702) is received from the IMU, and the image scene is rendered with the pose (and/or head position) information at 714. After the rendered image is sent to the head mounted display, another IMU pose (and/or head position) is sampled at block 716, and a two-dimensional (2 D) transform on the rendered image scene is performed and the image is then displayed at block 718. Similarly, the pose (and/or head position) 722 (in frame n+1 704) is received from the IMU, and the image scene is rendered with the pose (and/or head position) information at 724. After the rendered image is sent to the head mounted display, another IMU pose (and/or head position) is sampled at block 726, and a 2 D transform on the rendered image scene is performed and the image is then displayed at block 728. In the example illustrated in FIG. 7, the system performs an adjustment for time warp, but does not perform additional prediction of the position or orientation of the user.

FIG. 7 illustrates a simple implementation of time warp. When there is a large latency in sampling the IMU and displaying it on the HMD screen, a bad experience may occur for the user with image data that is not correctly being displayed for the user to view. Even systems that pre-render a video sequence in a sphere and show a subset of the image data have an inherent limitation that the data that was used to calculate the subset of view to render is usually stale by the time of the final display on the screen. If the head of the user is mostly static, there is not a huge issue with the correct image data being rendered and displayed, but if the user's head is moving rapidly, stale rendered and displayed image data could cause simulator sickness. For example, this can occur in some situations when the user stops moving and the image scene displayed for the user takes some time to update and the display feels to the user like it is still moving.

In some embodiments, predictive rendering of a larger frame buffer is implemented, and the data based on the predictive rendering is used to render the difference in motion. If the scene is rendered only to the exact specs of the display, the two-dimensional (2 D) transform loses information and will require blurring of the edge pixels of the rendered scene. This leads to loss of clarity along the edges of the image. In some embodiments, predictive image rendering is implemented to predict and accurately render image scenes based on head motion. In this manner, the 2 D transform window can be moved to the region and all the pixels can be displayed with clarity.

Figure 8:
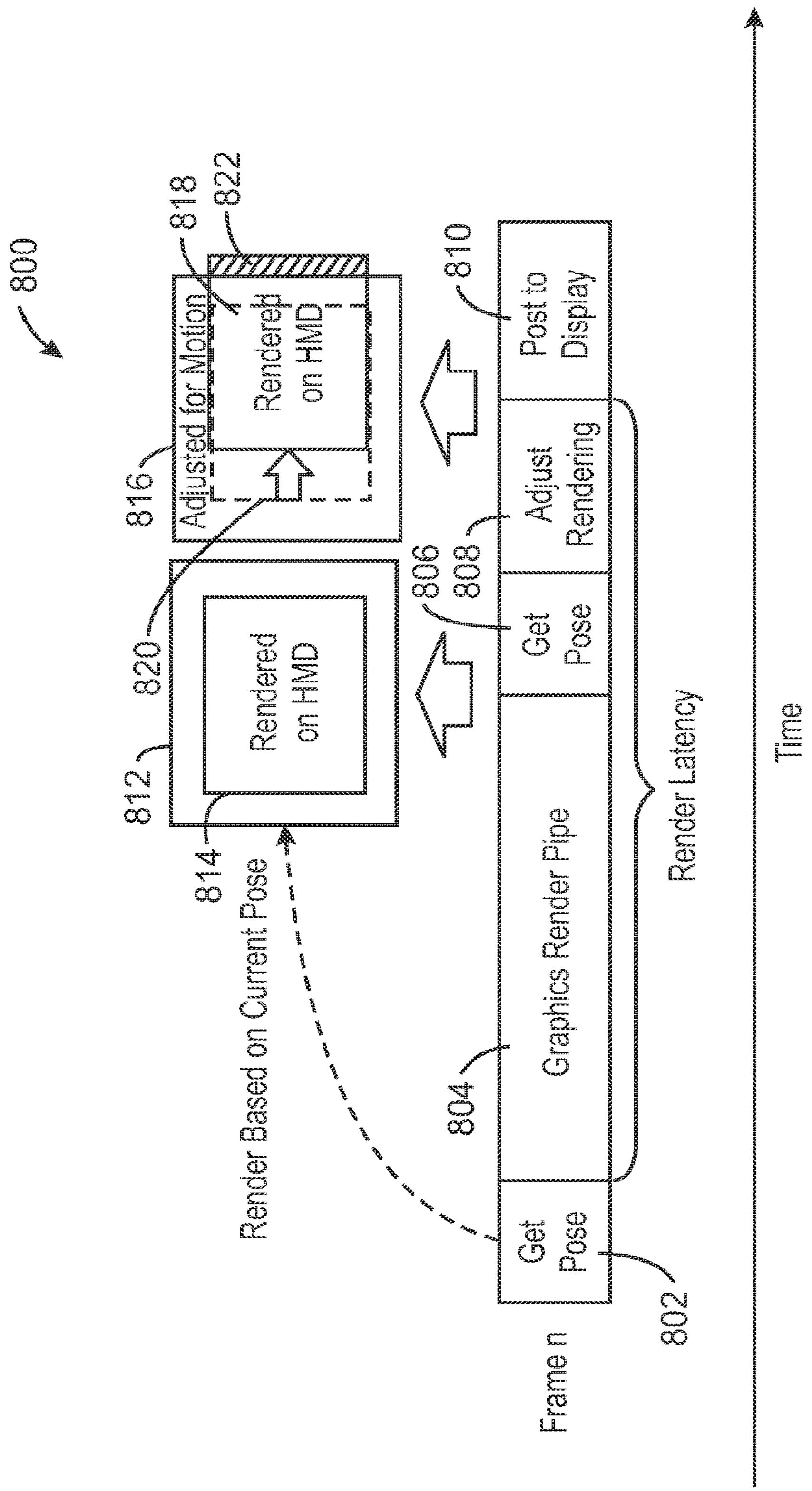
FIG. 8 illustrates display rendering.

FIG. 8 illustrates display rendering 800 according to some embodiments. FIG. 8 illustrates a situation where the pose (and/or head position) is obtained at 802 and the image scene is rendered with the pose (and/or head position) information in the graphics render pipe at 804. After the rendered image is sent to the head mounted display, another pose (and/or head position) is sampled at block 806, and the rendering is adjusted at 808 (for example, using a two-dimensional transform on the rendered image scene). The image is then posted to the display at block 810.

As illustrated in FIG. 8, block 812 shows a frame in which a large rendered target is shown in block 814. The rendered target 814 can be an image rendering for display on a head mounted display (HMD), for example. At a time shortly after the initial rendering at 814, block 816 shows a frame with an actual rendering 818 on the head mounted display. According to some embodiments, actual rendered image 818 can be adjusted (for example, using a time warp implementation). The adjustment is made from the initial rendering

814, which is also shown as initial rendering 820 in dotted lines in FIG. 8 for comparison purposes.

As illustrated in FIG. 8, a problem can occur where a head motion or latencies in the image display path can result in a lack of information required to display the contents based on the new field of view (FOV). This is illustrated, for example, by the portion 822 of rendered image 818 that extends beyond the frame 816. Such motion or latency (for example, due to latencies in the graphics pipeline and/or other latencies) can result in the HMD not having all of the correct image data to display on the HMD. However, according to some embodiments, these types of issues can be avoided.

In FIG. 8, the block portion 822 is shown in cross section. Block 822 is a portion of the data 818 rendered on the head mounted display, and represents missing required data. Although an adjustment of the rendering at block 808 is based, for example, on time warp, and the rendered image has been adjusted for motion, some of the required data may still be missing as represented by block 822 in FIG. 8. This occurs in situations where the image frame is adjusted to compensate for motion, but is too far from the original position, for example. That is, there is a risk of not having an appropriate full frame to display on the head mounted display. The graphics render pipeline 804 renders the image data based on a particular position at a particular time. However, when there is more latency and the head of the user moves beyond what the user actually expects to see (for example rendering 818 including portion 822), the rendering adjustment at block 808 based on the pose (and/or head position) sample obtained at block 806 is unable to show the entire portion since the motion moved beyond what was rendered in block 804 based on the pose (and/or head position) sample obtained at block 802. That is, adjustment is made for motion but may not be made for the entire latency, resulting in missing the required data illustrated by cross section 822 of rendered HMD image 818.

As illustrated in FIG. 8, if the frame that is adjusted to compensate for motion is too far from the original position, there is a risk of not having enough image information to display the necessary full frame on the HMD. By preparing an image render target based on a predicted amount of motion and latency, the risk of lacking content display is minimized. This is illustrated, for example, in FIG. 9. The flow of FIG. 9 shows how the original render frame makes better use of the buffer within the render target to account for the expected field of view (FOV) when the content is displayed.

Figure 9:
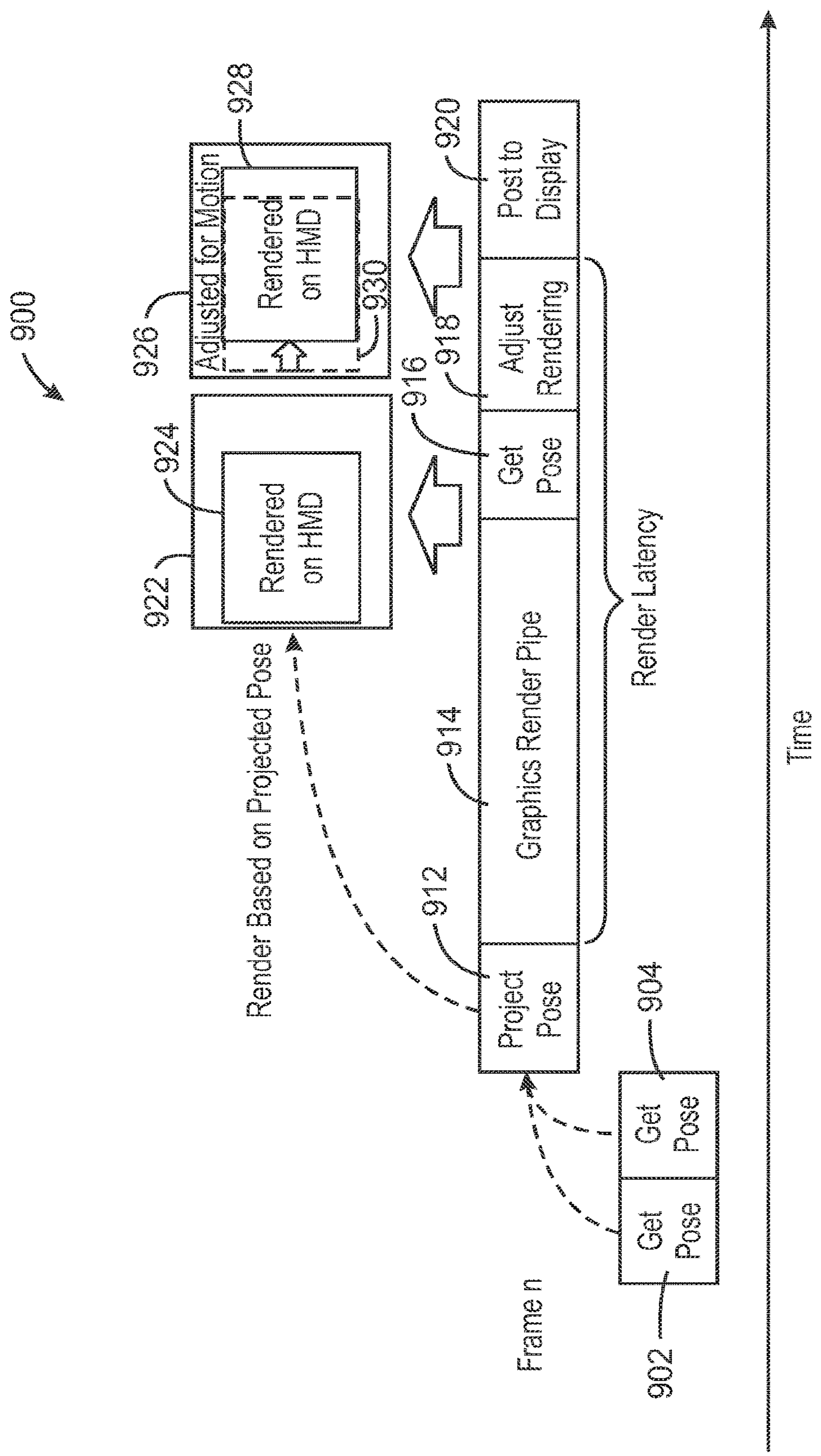
FIG. 9 illustrates display rendering.

FIG. 9 illustrates image rendering 900. At block 902 a pose (and/or head position) is sampled (for example at the host). At block 904, a pose (and/or head position) is sampled again at the host (for example, a period of time later such as 5 ms later). The pose (and/or head position) is projected at block 912. Block 914 shows a graphics render pipe at which the image is rendered based on the projected pose (and/or head position) at block 912. The rendered image is then transmitted to the head mounted display and the head mounted display samples a pose (and/or head position) at 916. The rendering is adjusted (for example based on a time warp, and/or an adjustment for motion, and/or an adjustment based on a projected or predicted pose and/or on a projected or predicted head position) at block 918. The adjusted image rendered at 918 is then posted to the display at 920. A rendering 922 at the host is additionally illustrated including a 924 rendering that is based on the projected or predicted pose (and/or head position) from block 912. In some embodiments, power can be saved by not rendering all or some of the portion of rendering 922. For example, in some embodiments, power can be saved by not rendering all or some of the portion of rendering 922 that is to the right side of rendering 924 in FIG. 9. Once the rendering 924 is transmitted to the head mounted display, block 926 illustrates the adjusted rendering 928 rendered by block 918 at the head mounted display. Dotted line 930 shows where the initial rendering would have been prior to adjustments.

The pose (and/or head position) sampled at 902 and the pose (and/or head position) sampled at 904 are used at block 912 to project (or predict) a pose (and/or head position) of the user (for example, a location and orientation of a user wearing a head mounted display). An image is rendered based on the predicted pose (and/or head position) determined at block 912.

In some embodiments, pose (and/or head position) prediction 912 can be implemented in one or more of a variety of ways. For example, according to some embodiments, a weighted average of past pose (and/or head position) vectors is maintained, and the weighted average of past pose (and/or head position) vectors is used to predict the rate of change of pose (and/or head position) for the next time interval. The velocity and acceleration of the pose (and/or head position) can be obtained by a simple vector of the change in position. Pose (and/or head position) tracking can also rely on filtering methods (such as, for example, Kalman filtering) to predict pose (and/or head position) at the next timestep. Dead reckoning can also be used as a method to estimate the next pose (and/or head position) according to some embodiments.

In some embodiments of FIG. 9, the projection (or production) of head pose (and/or head position) is based on a predicted latency determined by the obtained poses (and/or head positions) at 902 and 904 at the host, as well as the sample pose (and/or head position) 916 sampled at the HMD. In some embodiments of FIG. 9, the pose (and/or head position) is sampled at 902 and 904 (for example every 5 ms or so), and based on the sampling, a projected pose (and/or head position) 912 can be derived based on what will happen in the future at the time of display on the head mounted display (for example, in 30 ms). In some embodiments, the sampling (for example, every 5 ms) and image rendering may be implemented in the host system. In some embodiments, the sampling (for example, every 5 ms) and image rendering may be implemented in the head mounted display. As illustrated in FIG. 9, the system predicts where the head will be at some future point in time based on motion data. In some embodiments, head motion may be predicted using various techniques. For example, some head movements may include normal acceleration followed by deceleration. Possible head motions may be predictable in various embodiments. For example, when the head is moving the predicted position and orientation of the head can be accurately made according to some embodiments. In embodiments where this information can be predicted at the host system, it is possible to render less information in the graphics render pipeline 914 since the particular image that is rendered can be provided with a fair amount of certainty, and less additional information needs to be rendered and transmitted. In some embodiments, this information can also be confirmed in the head mounted display, and the predicted position and orientation (that is, the projected pose and/or projected head position 912) can be predicted with much more certainty in the host. For example, the prediction according to some embodiments can be used to make educated guesses (for example, a user will not snap their head back within a 30 ms period after the head is traveling the other direction during the 5 ms period). The two poses (and/or head positions) 902 and 904 can be used to predict the location and orientation at the later point in time. The head mounted display can later adjust the rendered image at 918 based on the predicted pose (and/or head position) 912 and an additional sampling of the pose (and/or head position) at 916 at the head mounted display. However, the information that needs to be rendered at 914 and sent from the host to the head mounted display is much more accurate and does not need to include as much additional information due to the prediction of the pose (and/or head position) based on the sampling occurring at the host system at 902 and 904. In this manner, the system is projecting the head position and orientation, and rendering the image at the host system based on that projection (prediction) information.

The image rendering can be adjusted at the head mounted display at block 918 based on the sampled poses and/or head positions at 902, 904 and 916. This adjustment can be made to adjust for motion and for the predicted pose (and/or head position) 912 based on the various sampled poses and/or sampled head positions. This adjustment includes a time warp and/or an adjustment based on the projected pose (and/or head position). This adjustment may be made based on a reduced rendering 924 that is sent to the head mounted display. In some embodiments, power can be saved since a lesser size rendering 924 can be rendered by the graphics render pipeline 914. The adjusted rendering 918 can then be used to post the rendered image 928 (which has been adjusted for motion and latency, for example) and posted to the display at block 920. In some embodiments, a rendered image 928 is rendered based on head motion and velocity of motion of the user.

In some embodiments (for example, as illustrated in and described in reference to FIG. 9), adjustment is made for motion and for the entire latency based on time warp motion adjustment as well as based on a projected pose (and/or head position) using predicted pose (and/or head position) information. This creates a situation where a lesser amount of rendered data may be rendered and transmitted to the head mounted display without any required data missing (for example, such as missing required data 822 illustrated in FIG. 8). In some embodiments of FIG. 9, for example, by predicting the position and orientation of the user of the head mounted display, it is possible to render and transmit less data and still ensure that required data is not missing, and can be displayed to the user at the head mounted display at the appropriate time.

In some embodiments, the projected (or predicted) pose (and/or head position) is determined at the host and transmitted to the HMD. The image rendered on the head mounted display is adjusted based on the projected pose (and/or head position) as well as additional pose (and/or head position) information received at block 916.

In some embodiments, projected and/or predicted pose (and/or head position) coordinates and timestamp can be used to render the frame as metadata alongside (for example, in sideband) or as part of (for example, in-band) the frame data. For example, in some embodiments, the projected pose (and/or head position) coordinates and timestamp, for example, sampled from a sensor such as an IMU and then calculated based on the sampling(s), can be used to render the image frame as metadata alongside (for example, in a sideband) or as part of (for example in-band) the frame image data.

In some embodiments, time warp, when employed, applies last-minute adjustments to the rendered frame to correct for any changes in the user's pose and/or head position (for example, HMD position and/or orientation). Explicitly knowing the coordinates+timestamp that were used (projected or measured) when rendering the frame can allow time warp adjustment to more accurately correct for these changes.

In some embodiments, time warp can be disabled when pose (and/or head position) projection is used. However, this could produce an inability to correct for incorrect projections caused by unexpected changes in head movement (incorrect vector), variable-latency transports (incorrect presentation time), etc.

In some embodiments, relative sampling can be useful when both render and time warp adjustments occur in the same system. Sampling such as IMU sampling can be performed in a manner that allows the coordinates and time delta (render vs. warp) to easily be calculated. However, it can be difficult to support projected pose (and/or head position) and extend it to a system where the sink device performs offload (for example, virtual reality offload).

In some embodiments, metadata information conveyed to the back end time warp (in addition to the rendered frame) can include a render position (for example, 3 dimensional x,y, and z coordinates and/or yaw, pitch and roll information in some embodiments, and/or in some embodiments a 3 dimensional coordinate position as well as vector coordinates conveying a viewing orientation of the user's head in addition to the coordinate position thereof). In some embodiments, an exact position (sampled or projected) is used to render the image frame. In some embodiments, a render timestamp with an exact time (rendered or projected) is used to render an image frame.

In some embodiments, a host side includes a transmitter and an HMD side includes a receiver. However, in some embodiments, it is noted that the transmitter on the host side and/or the receiver on the HMD side can be a transceiver, allowing communication in either direction.

In some embodiments, transmission between a host system and a head mounted display can be wired or wireless. For example, in an embodiment with wired transmission the connection between host and head mounted display may be an HDMI wired connector, for example.

In some embodiments, the host system is a computer, and in some embodiments the host system is implemented in a cloud infrastructure. In some embodiments, any of the operations/functionality/structure are performed at the HMD. In some embodiments, any of the operations/functionality/structure are performed at the host. In some embodiments, image rendering is implemented in a cloud infrastructure. In some embodiments, image rendering is implemented in a combination of a local computer and a cloud infrastructure. In some embodiments, image rendering is implemented in a head mounted display. In some embodiments, image rendering is implemented in a computer at a host side or a computer at an HMD side.

In some embodiments, motion prediction, head position prediction, and/or pose prediction (for example, motion projection and/or pose projection) is implemented in one of many ways. For example, in some embodiments, it is implemented by maintaining a weighted average of past pose (and/or head position) vectors, and using the weighted average to predict the rate of change of pose (and/or head position) for the next time interval. In some embodiments, the velocity and acceleration of the pose (and/or head position) are obtained by a simple vector of the change in position. In some embodiments, pose (and/or head position) tracking relies on filtering methods (for example, such as Kalman filtering) to predict pose (and/or head position) at the next timestep. In some embodiments, dead reckoning can be used to estimate the next pose (and/or head position). In some embodiments, external sensors (for example, cameras such as depth cameras) may be used to obtain pose (and/or head position) information, either in addition to or instead of sampling pose (and/or head position) information from a sensor such as an IMU of the HMD, for example.

Some embodiments have been described as sampling pose (and/or head position) information at a certain frequency (for example, after 5 ms, etc.). It is noted that other frequencies may be used (for example, after 2 ms). It is also noted that more samples may be taken according to some embodiments (for example, every 2 ms, every 5 ms, etc., or additional pose (and/or head position) samples such as three or more pose (and/or head position) samples obtained at the host rather than two samples, etc).

In some embodiments, known data about the movement of a person's head may be used to predict user location and orientation. For example, maximum known speed of a human head, known directions and likely continued movements of human heads, etc. may be used. In some embodiments, the known information being presented on the HMD display may be used in order to predict user location and orientation. For example, perceptual computing may be implemented. If something is about to move fast in a virtually displayed environment, since people are very aware of fast motion, a user may be inclined to move their head toward that motion. Similarly, if a sound were to be provided, in some embodiments it can be predicted that the user is likely to turn their head toward that sound. In some embodiments, since the eyes are a good indicator of where the head might turn, sensors may be used in some embodiments to track eye movement of the user to help predict which direction the user may turn their head.

Some embodiments have been described herein as including a host system (for example, host system 402 of FIG. 4 or host system 502 of FIG. 5). It is noted that in some embodiments, the host system could be a computer, a desktop computer, or even a cloud system, and is not limited to a particular type of host system. Additionally, many or all features, elements, functions, etc. described herein as included within or performed by a host system could be performed elsewhere (for example, within a head mounted display or within another device coupled to a head mounted display).

Some embodiments have been described herein as being related to display of rendered data in a head mounted display (HMD) environment. However, according to some embodiments techniques used herein can be used in other non-HMD environments (for example, in any case where images are rendered for display, but the desired image to be displayed might change based on latencies in the system due to image rendering, some type of movement, transmission of data such as the rendered image, and/or other latencies).

In some embodiments, predictive rendering may be used in a head mounted display system where the head mounted display communicates wirelessly (for example, where the HMD communicates wirelessly with a host system, the cloud, etc). Predictive rendering for wireless HMDs according to some embodiments can provide reduced power and/or increased efficiency.

Figure 10:
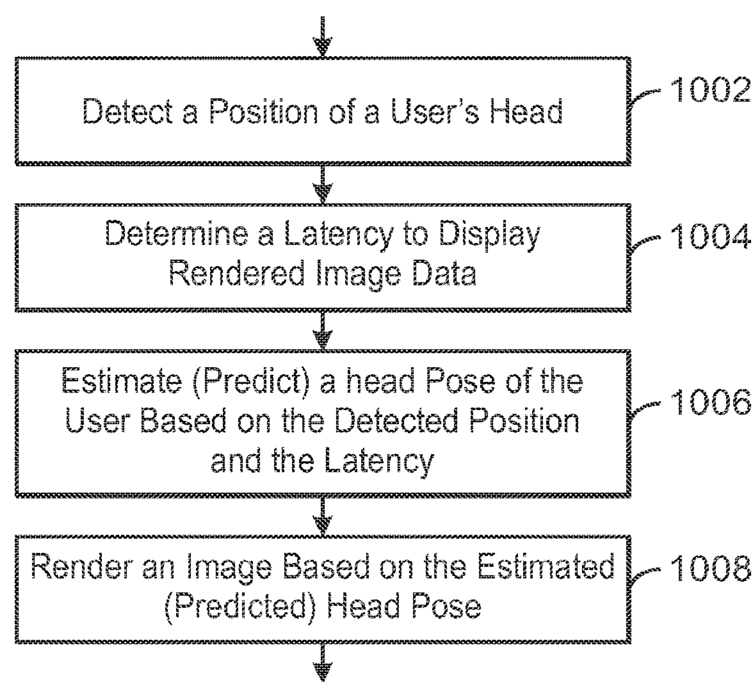
FIG. 10 illustrates display rendering.

FIG. 10 illustrates display rendering 1000 according to some embodiments. In some embodiments, display rendering 1000 can include one or more of display rendering, image rendering, predictive rendering, projected pose, projected head position, time warping optimization, and/or predicted rendering, etc. At 1002, a position of a user's head can be detected (for example, a position of a head of user of a head mounted display system). In some embodiments, a pose and/or position of the user's head is obtained at 1002 using an IMU, an accelerator, a gyroscope, and/or some other sensor, for example. At 1004, a latency in displaying rendered image data is determined. This latency can be due to, for example, one or more of latency in sampling, latency in obtaining a head pose (and/or head position) of a user, latency due to motion, latency due to movement of a head of a user, latency due to movement of a head of a user of a head mounted display, latency due to a potential change of head movement, latency due to image rendering, latency due to image render processing, latency due to graphics rendering, latency due to transmission, latency due to transmission between a host system and a head mounted display, wireless transmission latency, non-static or changing latencies over time, latency due to predicted known possible head movements, and/or any other latencies, etc. At 1006, a head pose (and/or head position) of a user is estimated (and/or is predicted) based on, for example, a detected position of the user's head and any or all latencies. At 1008, an image is rendered based on the estimated (or predicted) head pose (and/or head position). A portion or all of the rendered image can then be displayed (for example, on a head mounted display).

In some embodiments, display rendering 1000 can implement display rendering features as described and/or illustrated anywhere in this specification and drawings. In some embodiments, display rendering 1000 can use available and/or obtained head motion information to predict future head poses and/or head positions, and adjust the render target accordingly. In some embodiments, a buffer (for example, an image buffer, a graphics buffer, a rendering buffer, and/or any other type of buffer) can efficiently minimize a risk of not having proper content to display due to motion (for example, motion of a user's head) and/or due to latencies (for example, transmission latencies, rendering latencies, etc). In some embodiments, rendering 1000 can reduce an amount of data that needs to be rendered but not displayed. This can result in better power efficiency.

In some embodiments, display rendering 1000 can optimize a render target by estimating an expected field of view (FOV) at a time of display. This can be based on understanding of a latency to display the render target and/or estimating a head pose and/or head position (for example, based on sensor data such as an IMU, accelerometers, gyroscopes, camera sensors, etc. in order to detect head movement). In some embodiments, display rendering 1000 can predictively render a large frame buffer and use the data to render the difference in motion. In some embodiments, display rendering 1000 can predict and accurately render image scenes based on head motion. In some embodiments, display rendering 1000 can implement two dimensional (2 D) transform, and can move a 2 D transform window and display pixels with clarity.

In some embodiments, display rendering 1000 can implement motion prediction in one of many ways. For example, in some embodiments, display rendering 1000 can implement motion prediction using a weighted average of past pose (and/or head position) vectors, and using the weighted average to predict a rate of change of pose (and/or head position) for a next time interval. Velocity and acceleration of the pose (and/or head position) can be obtained in some embodiments by a simple vector of the change in position. In some embodiments, display rendering 1000 can implement pose (and/or head position) tracking using filtering methods (for example, using filtering methods such as Kalman filtering) to predict a pose (and/or head position) at a next time step. In some embodiments, display rendering 1000 can use dead reckoning to estimate a next pose (and/or head position).

Figure 11:
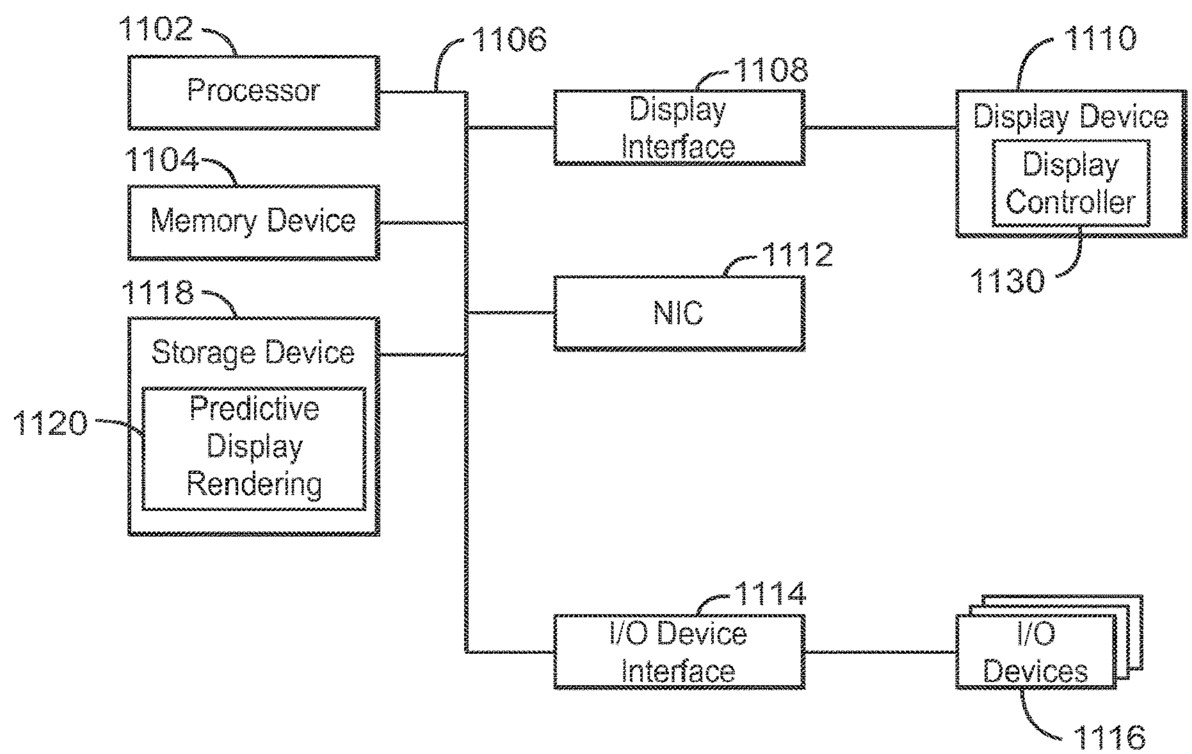
FIG. 11 illustrates a computing device.

FIG. 11 is a block diagram of an example of a computing device 1100. In some embodiments, computing device 1100 can include display and/or image features including one or more of display rendering, image rendering, predictive rendering, projected pose, projected head position, time warping optimization, predicted rendering, etc. and/or any other features or techniques discussed herein according to some embodiments. For example, any of the features illustrated in and/or described in reference to any one or more of FIGS. 1-11 can be included within computing device 1100. For example, in some embodiments, all of part of computing device 1100 can be included as host system 402 of FIG. 4 or host system 502 of FIG. 5. As another example, in some embodiments, all or part of computing device 1100 can be included as head mounted display 404 of FIG. 4 or head mounted display 504 of FIG. 5.

The computing device 1100 may be, for example, a mobile device, phone, laptop computer, notebook, tablet, all in one, 2 in 1, and/or desktop computer, etc., among others. The computing device 1100 may include a processor 1102 that is adapted to execute stored instructions, as well as a memory device 1104 (and/or storage device 1104) that stores instructions that are executable by the processor 1102. The processor 1102 can be a single core processor, a multi-core processor, a computing cluster, or any number of other configurations. For example, processor 1102 can be an Intel® processor such as an Intel® Celeron, Pentium, Core, Core i3, Core i5, or Core i7 processor. In some embodiments, processor 1102 can be an Intel® x86 based processor. In some embodiments, processor 1102 can be an ARM based processor. The memory device 1104 can be a memory device and/or a storage device, and can include volatile storage, non-volatile storage, random access memory, read only memory, flash memory, and/or any other suitable memory and/or storage systems. The instructions that are executed by the processor 1102 may also be used to implement features described in this specification, including display coordinate configuration, for example.

The processor 1102 may also be linked through a system interconnect 1106 (e.g., PCI®, PCI-Express®, NuBus, etc.) to a display interface 1108 adapted to connect the computing device 1100 to a display device 1110. In some embodiments, display device 1110 can include any display screen. The display device 1110 may include a display screen that is a built-in component of the computing device 1100. The display device 1110 may also include a computer monitor, television, or projector, among others, that is externally connected to the computing device 1100. The display device 1110 can include liquid crystal display (LCD), for example. In addition, display device 1110 can include a backlight including light sources such as light emitting diodes (LEDs), organic light emitting diodes (OLEDs), and/or micro-LEDs (μLEDs), among others.

In some embodiments, the display interface 1108 can include any suitable graphics processing unit, transmitter, port, physical interconnect, and the like. In some examples, the display interface 1108 can implement any suitable protocol for transmitting data to the display device 1110. For example, the display interface 1108 can transmit data using a high-definition multimedia interface (HDMI) protocol, a DisplayPort protocol, or some other protocol or communication link, and the like In some embodiments, display device 1110 includes a display controller 1130. In some embodiments, the display controller 1130 can provide control signals within and/or to the display device 1110. In some embodiments, all or portions of the display controller 1130 can be included in the display interface 1108 (and/or instead of or in addition to being included in the display device 1110). In some embodiments, all or portions of the display controller 1130 can be coupled between the display interface 1108 and the display device 1110. In some embodiments, all or portions of the display controller 1130 can be coupled between the display interface 1108 and the interconnect 1106. In some embodiments, all or portions of the display controller 1130 can be included in the processor 1102. In some embodiments, display controller 1130 can implement one or more of display rendering, image rendering, predictive rendering, projected pose, projected head position, time warping optimization, predicted rendering, etc. and/or any other features or techniques discussed herein according to any of the examples illustrated in any of the drawings and/or as described anywhere herein. For example, any of the features illustrated in and/or described in reference to all or portions of any one or more of FIGS. 1-10 can be included within display controller 1130.

In some embodiments, any of the techniques described in this specification can be implemented entirely or partially within the display device 1110. In some embodiments, any of the techniques described in this specification can be implemented entirely or partially within the display controller 1130. In some embodiments, any of the techniques described in this specification can be implemented entirely or partially within the processor 1102.

In addition, a network interface controller (also referred to herein as a NIC) 1112 may be adapted to connect the computing device 1100 through the system interconnect 1106 to a network (not depicted). The network (not depicted) may be a wireless network, a wired network, cellular network, a radio network, a wide area network (WAN), a local area network (LAN), a global position satellite (GPS) network, and/or the Internet, among others.

The processor 1102 may be connected through system interconnect 1106 to an input/output (I/O) device interface 1114 adapted to connect the computing host device 1100 to one or more I/O devices 1116. The I/O devices 1116 may include, for example, a keyboard and/or a pointing device, where the pointing device may include a touchpad or a touchscreen, among others. The I/O devices 1116 may be built-in components of the computing device 1100, or may be devices that are externally connected to the computing device 1100.

In some embodiments, the processor 1102 may also be linked through the system interconnect 1106 to a storage device 1118 that can include a hard drive, a solid state drive (SSD), a magnetic drive, an optical drive, a portable drive, a flash drive, a Universal Serial Bus (USB) flash drive, an array of drives, and/or any other type of storage, including combinations thereof. In some embodiments, the storage device 1118 can include any suitable applications. In some embodiments, the storage device 1118 can include a basic input/output system (BIOS).

In some embodiments, the storage device 1118 can include any device or software, instructions, etc. that can be used (for example, by a processor such as processor 1102) to implement any of the functionality described herein such as, for example, one or more of display rendering, image rendering, predictive rendering, projected pose, projected head position, time warping optimization, predicted rendering, etc. and/or any other features or techniques discussed herein. In some embodiments, for example, predictive display rendering 1120 is included in storage device 1118. In some embodiments, predictive display rendering 1120 incudes a portion or all of any one or more of the techniques described herein. For example, any of the features illustrated in and/or described in reference to any portions of one or more of FIGS. 1-10 can be included within predictive display rendering 1120.

It is to be understood that the block diagram of FIG. 11 is not intended to indicate that the computing device 1100 is to include all of the components shown in FIG. 11. Rather, the computing device 1100 can include fewer and/or additional components not illustrated in FIG. 11 (e.g., additional memory components, embedded controllers, additional modules, additional network interfaces, etc.). Furthermore, any of the functionalities of the BIOS or of the optimization predictive display rendering 1120 that can be included in storage device 1118 may be partially, or entirely, implemented in hardware and/or in the processor 1102. For example, the functionality may be implemented with an application specific integrated circuit, logic implemented in an embedded controller, or in logic implemented in the processor 1102, among others. In some embodiments, the functionalities of the BIOS and/or predictive display rendering 1120 can be implemented with logic, wherein the logic, as referred to herein, can include any suitable hardware (e.g., a processor, among others), software (e.g., an application, among others), firmware, or any suitable combination of hardware, software, and/or firmware.

Figure 12:
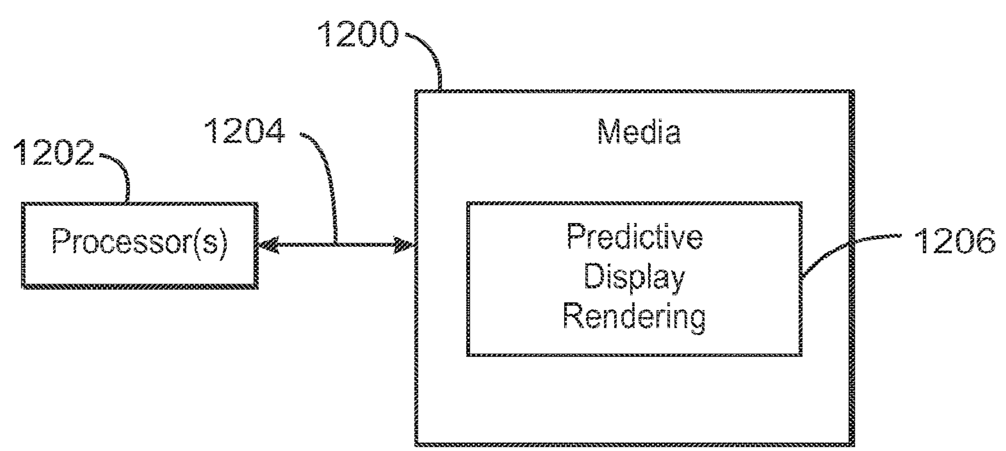
FIG. 12 illustrates one or more processor and one or more tangible, non-transitory computer readable media.

FIG. 12 is a block diagram of an example of one or more processor and one or more tangible, non-transitory computer readable media. The one or more tangible, non-transitory, computer-readable media 1200 may be accessed by a processor or processors 1202 over a computer interconnect 1204. Furthermore, the one or more tangible, non-transitory, computer-readable media 1200 may include code to direct the processor 1202 to perform operations as described herein. For example, in some embodiments, computer-readable media 1200 may include code to direct the processor to perform predictive display rendering 1206, which can include display rendering, image rendering, predictive rendering, projected pose, projected head position, time warping optimization, predicted rendering, etc. and/or any other features or techniques discussed herein according to some embodiments. In some embodiments, predictive display rendering 1206 can be used to provide any of the features or techniques according to any of the examples illustrated in any of the drawings and/or as described anywhere herein. For example, any of the features illustrated in and/or described in reference to portions of any one or more of FIGS. 1-10 can be included within predictive display rendering 1206.

In some embodiments, processor 1202 is one or more processors. In some embodiments, processor 1202 can perform similarly to (and/or the same as) processor 1102 of FIG. 11, and/or can perform some or all of the same functions as can be performed by processor 1102.

Various components discussed in this specification may be implemented using software components. These software components may be stored on the one or more tangible, non-transitory, computer-readable media 1200, as indicated in FIG. 12. For example, software components including, for example, computer readable instructions implementing predictive display rendering 1206 may be included in one or more computer readable media 1200 according to some embodiments.

It is to be understood that any suitable number of software components may be included within the one or more tangible, non-transitory computer-readable media 1200. Furthermore, any number of additional software components not shown in FIG. 12 may be included within the one or more tangible, non-transitory, computer-readable media 1200, depending on the specific application.

Embodiments have been described herein relating to head mounted displays, head pose and/or head position detection/prediction, etc. However, it is noted that some embodiments relate to other image and/or display rendering than in head mounted displays. Some embodiments are not limited to head mounted displays or head pose and/or head position. For example, in some embodiments, a position of all or a portion of a body of a user can be used (for example, using a projected pose and/or position of a portion of a body of a user including the user's head or not including the user's head). Motion and/or predicted motion, latency, etc. of other body parts than a user's head can be used in some embodiments. In some embodiments, body parts may not be involved. For example, some embodiments can relate to movement of a display or other computing device, and prediction of motion and/or latency relating to those devices can be implemented according to some embodiments.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

EXAMPLE 1

In some examples, a head mounted display system including one or more processor. The one or more processor is to detect a position of a head of a user of the head mounted display, predict a position of the head of the user of the head mounted display at a time after a time that the position of the head of the user was detected, and render image data based on the predicted head position.

EXAMPLE 2

In some examples, the head mounted display system of Example 1, including a transmitter to transmit the rendered image data to the head mounted display.

EXAMPLE 3

In some examples, the head mounted display system of Example 1 or Example 2, the one or more processor to create an image to be displayed on the head mounted display based on the predicted position and based on the rendered image data.

EXAMPLE 4

In some examples, the head mounted display system of any of Examples 1-3, the one or more processor to display an image on the head mounted display based on the rendered image data.

EXAMPLE 5

In some examples, the head mounted display system of any of Examples 1-4, the one or more processor to estimate an expected field of view of the user at a time of display, and to render the image data based on the predicted head position and based on the expected field of view.

EXAMPLE 6

In some examples, the head mounted display system of any of Examples 1-5, the one or more processor to perform a two dimensional transform on the rendered image data.

EXAMPLE 7

In some examples, the head mounted display system of any of Examples 1-6, the one or more processor to maintain a weighted average of past head position vectors, and to predict the position of the head based on the weighted average.

EXAMPLE 8

In some examples, the head mounted display system of any of Examples 1-7, the one or more processor to predict the position of the head based on a filtering method.

EXAMPLE 9

In some examples, the head mounted display system of any of Examples 1-8, the one or more processor to predict the position of the head based on dead reckoning.

EXAMPLE 10

In some examples, the head mounted display system of any of Examples 1-9, the one or more processor to render the image data based on a predicted amount of motion and latency.

EXAMPLE 11

In some examples, the head mounted display system of any of Examples 1-10, the one or more processor to determine a latency to display the rendered image data, and to predict the position of the head of the user based on the detected position and based on the determined latency.

EXAMPLE 12

In some examples, a method including detecting a position of a head of a user of a head mounted display, predicting a position of the head of the user of the head mounted display at a time after a time that the position of the head of the user was detected, and rendering image data based on the predicted head position.

EXAMPLE 13

In some examples, the method of Example 12, including transmitting the rendered image data to the head mounted display.

EXAMPLE 14

In some examples, the method of any of Examples 12-13, including creating an image to be displayed on the head mounted display based on the predicted position and based on the rendered image data.

EXAMPLE 15

In some examples, the method of any of Examples 12-14, including displaying an image on the head mounted display based on the rendered image data.

EXAMPLE 16

In some examples, the method of any of Examples 12-15, including estimating an expected field of view of the user at a time of display, and rendering the image data based on the predicted head position and based on the expected field of view.

EXAMPLE 17

In some examples, the method of any of Examples 12-16, including performing a two dimensional transform on the rendered image data.

EXAMPLE 18

In some examples, the method of any of Examples 12-17, including maintaining a weighted average of past head position vectors, and predicting the position of the head based on the weighted average.

EXAMPLE 19

In some examples, the method of any of Examples 12-18, including predicting the position of the head based on a filtering method.

EXAMPLE 20

In some examples, the method of any of Examples 12-19, including predicting the position of the head based on dead reckoning.

EXAMPLE 21

In some examples, the method of any of Examples 12-20, including rendering the image data based on a predicted amount of motion and latency.

EXAMPLE 22

In some examples, the method of any of Examples 12-21, including determining a latency to display the rendered image data, and predicting the position of the head of the user based on the detected position and based on the determined latency.

EXAMPLE 23

In some examples, one or more tangible, non-transitory machine readable media include a plurality of instructions that, in response to being executed on at least one processor, cause the at least one processor to detect a position of a head of a user of a head mounted display, predict a position of the head of the user of the head mounted display at a time after a time that the position of the head of the user was detected, and render image data based on the predicted head position.

EXAMPLE 24

In some examples, the one or more tangible, non-transitory machine readable media of Example 23, including a plurality of instructions that, in response to being executed on at least one processor, cause the at least one processor to transmit the rendered image data to the head mounted display.

EXAMPLE 25

In some examples, the one or more tangible, non-transitory machine readable media of any of Examples 23-24, including a plurality of instructions that, in response to being executed on at least one processor, cause the at least one processor to create an image to be displayed on the head mounted display based on the predicted position and based on the rendered image data.

EXAMPLE 26

In some examples, the one or more tangible, non-transitory machine readable media of any of Examples 23-25, including a plurality of instructions that, in response to being executed on at least one processor, cause the at least one processor to display an image on the head mounted display based on the rendered image data.

EXAMPLE 27

In some examples, the one or more tangible, non-transitory machine readable media of any of Examples 23-26, including a plurality of instructions that, in response to being executed on at least one processor, cause the at least one processor to estimate an expected field of view of the user at a time of display, and to render the image data based on the predicted head position and based on the expected field of view.

EXAMPLE 28

In some examples, the one or more tangible, non-transitory machine readable media of any of Examples 23-27, including a plurality of instructions that, in response to being executed on at least one processor, cause the at least one processor to perform a two dimensional transform on the rendered image data.

EXAMPLE 29

In some examples, the one or more tangible, non-transitory machine readable media of any of Examples 23-28, including a plurality of instructions that, in response to being executed on at least one processor, cause the at least one processor to maintain a weighted average of past head position vectors, and to predict the position of the head based on the weighted average.

EXAMPLE 30

In some examples, the one or more tangible, non-transitory machine readable media of any of Examples 23-29, including a plurality of instructions that, in response to being executed on at least one processor, cause the at least one processor to predict the position of the head based on a filtering method.

EXAMPLE 31

In some examples, the one or more tangible, non-transitory machine readable media of any of Examples 23-30, including a plurality of instructions that, in response to being executed on at least one processor, cause the at least one processor to predict the position of the head based on dead reckoning.

EXAMPLE 32

In some examples, the one or more tangible, non-transitory machine readable media of any of Examples 23-31, including a plurality of instructions that, in response to being executed on at least one processor, cause the at least one processor to render the image data based on a predicted amount of motion and latency.

EXAMPLE 33

In some examples, the one or more tangible, non-transitory machine readable media of any of Examples 23-24, including a plurality of instructions that, in response to being executed on at least one processor, cause the at least one processor to determine a latency to display the rendered image data, and to predict the position of the head of the user based on the detected position and based on the determined latency.

EXAMPLE 34

In some examples, a display system includes means for detecting a position of a head of a user of the display at a first time, means for predicting a position of the head of the user of the display at a second time that is after the first time, and means for rendering image data based on the predicted head position. In some examples, the display system is a head mounted display system.

EXAMPLE 35

In some examples, the display system of Example 34, including means for transmitting the rendered image data to the display.

EXAMPLE 36

In some examples, the display system of any of Examples 34-35, including means for creating an image to be displayed on the display based on the predicted position and based on the rendered image data.

EXAMPLE 37

In some examples, the display system of any of Examples 34-36, including means for displaying an image on the display based on the rendered image data.

EXAMPLE 38

In some examples, the display system of any of Examples 34-37, including means for estimating an expected field of view of the user at a time of display, and means for rendering the image data based on the predicted head position and based on the expected field of view.

EXAMPLE 39

In some examples, the display system of any of Examples 34-38, including means for performing a two dimensional transform on the rendered image data.

EXAMPLE 40

In some examples, the display system of any of Examples 34-39, including means for maintaining a weighted average of past head position vectors, and means for predicting the position of the head based on the weighted average.

EXAMPLE 41

In some examples, the display system of any of Examples 34-40, including means for predicting the position of the head based on a filtering method.

EXAMPLE 42

In some examples, the display system of any of Examples 34-41, including means for predicting the position of the head based on dead reckoning.

EXAMPLE 43

In some examples, the display system of any of Examples 34-42, including means for rendering the image data based on a predicted amount of motion and latency.

EXAMPLE 44

In some examples, the display system of any of Examples 34-43, including means for determining a latency to display the rendered image data, and means for predicting the position of the head of the user based on the detected position and based on the determined latency.

EXAMPLE 45

In some examples, an apparatus including means to perform a method as in any preceding Example.

EXAMPLE 46

In some examples, machine-readable instructions, when executed, to implement a method, realize an apparatus, or realize a system as in any preceding Example.

EXAMPLE 47

In some examples, A machine readable medium including code, when executed, to cause a machine to perform the method, realize an apparatus, or realize a system as in any one of the preceding Examples.

EXAMPLE 48

In some examples, a head mounted display system includes a first processor to predict a pose (and/or head position) of a user of the head mounted display, a second processor to render an image based on the predicted pose (and/or head position), and a transmitter to transmit the rendered image to the head mounted display.

EXAMPLE 49

In some examples, a head mounted display system includes a processor to receive a predicted pose (and/or head position) of a user of the head mounted display and to receive a rendered image that is based on the predicted pose (and/or head position). The processor is to create an image to be displayed on the head mounted display based on the predicted pose (and/or head position) and based on the rendered image.

EXAMPLE 50

In some examples, a head mounted display system includes a first processor to predict a pose (and/or head position) of a user of the head mounted display, a second processor to render an image based on the predicted pose (and/or head position), and a third processor to create an image to be displayed on the head mounted display based on the predicted pose (and/or head position) and based on the rendered image.

EXAMPLE 51

In some examples, at least one computer-readable medium includes instructions to direct a processor to predict a pose (and/or head position) of a user of a head mounted display, render an image based on the predicted pose (and/or head position), and transmit the rendered image to the head mounted display.

EXAMPLE 52

In some examples, at least one computer-readable medium includes instructions to direct a processor to predict a pose (and/or head position) of a user of a head mounted display, render an image based on the predicted pose (and/or head position), and display an image on the head mounted display based on the predicted pose (and/or head position) and based on the rendered image.

EXAMPLE 53

In some examples, at least one computer-readable medium includes instructions to direct a processor to receive a predicted pose (and/or head position) of a user of a head mounted display, receive a rendered image that is based on the predicted pose (and/or head position), and create an image to be displayed on the head mounted display based on the predicted pose (and/or head position) and based on the rendered image.

EXAMPLE 54

In some examples, a method includes predicting a pose (and/or head position) of a user of a head mounted display, rendering an image based on the predicted pose (and/or head position), and transmitting the rendered image to the head mounted display.

EXAMPLE 55

In some examples, a method includes predicting a pose (and/or head position) of a user of a head mounted display, rendering an image based on the predicted pose (and/or head position), and displaying an image on the head mounted display based on the predicted pose (and/or head position) and based on the rendered image.

EXAMPLE 56

In some examples, a method includes receiving a predicted pose (and/or head position) of a user of a head mounted display, receiving a rendered image that is based on the predicted pose (and/or head position), and creating an image to be displayed on the head mounted display based on the predicted pose (and/or head position) and based on the rendered image.

Although an example embodiments of the disclosed subject matter are described with reference to FIGS. 1-12, persons of ordinary skill in the art will readily appreciate that many other ways of implementing the disclosed subject matter may alternatively be used. For example, the order of execution of the blocks in flow diagrams may be changed, and/or some of the blocks in block/flow diagrams described may be changed, eliminated, or combined. Additionally, some of the circuit and/or block elements may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. An apparatus comprising:

network interface circuitry;

memory;

instructions; and processor circuitry to execute the instructions to:

- determine a latency, the latency based on a time to display a rendered image;
- determine a future user pose at a prediction interval, wherein the future user pose is based on input data, wherein the input data includes a position and an orientation of a user, and wherein the prediction interval is based on the latency;
- render an image for display based on the future user pose; and
- cause transmission of the rendered image via the network interface circuitry.

2. The apparatus of claim 1, wherein the input data is related to motion of a head of the user.

3. The apparatus of claim 1, wherein the input data includes sensor data from an inertial measurement unit (IMU).

4. The apparatus of claim 1, wherein the input data includes sensor data from a camera.

5. The apparatus of claim 1, wherein the latency includes at least one of network latency, render latency, or display latency.

6. The apparatus of claim 1, wherein the processor circuitry is to determine the future user pose based on Kalman filtering.

7. The apparatus of claim 1, wherein the processor circuitry is to determine the future user pose based on a series of previous user poses.

8. At least one tangible, non-transitory computer readable storage medium comprising instructions to cause processor circuitry to at least:

determine a latency based on a time to display a rendered image;

determine a future pose of a user at a prediction interval, wherein the future pose is based on input data, the input data includes a position and an orientation of the user, and the prediction interval is based on the latency;

render an image based on the future pose; and cause transmission of the rendered image to a client device.

9. The at least one computer readable storage medium of claim 8, wherein the input data is associated with motion of a head of the user.

10. The at least one computer readable storage medium of claim 8, wherein the input data includes sensor data from an inertial measurement unit (IMU).

11. The at least one computer readable storage medium of claim 8, wherein the input data includes sensor data from a camera.

12. The at least one computer readable storage medium of claim 8, wherein the latency includes at least one of network latency, render latency, or display latency.

13. The at least one computer readable storage medium of claim 8, wherein the instructions cause the processor circuitry to determine the future pose based on Kalman filtering.

14. The at least one computer readable storage medium of claim 8, wherein the instructions cause the processor circuitry to determine the future pose based on a time series of past poses of the user.

15. An apparatus comprising:

means for connecting via a network;

means for storing to store machine-readable instructions;

means for processing to:

determine a latency to determine a latency based on a time to display a rendered image;

predict a future user pose at a prediction interval, wherein the future user pose is based on input data, wherein the input data includes a position and an orientation of a user, and wherein the prediction interval is based on the latency; and render an image based on the future user pose; and means for transmitting to transmit the rendered image for display via the means for connecting.

16. The apparatus of claim 15, wherein the input data is related to motion of a head of the user.

17. The apparatus of claim 15, wherein the input data includes sensor data from an inertial measurement unit (IMU).

18. The apparatus of claim 15, wherein the input data includes sensor data from a camera.

19. The apparatus of claim 15, wherein the latency includes at least one of network latency, render latency, or display latency.

20. The apparatus of claim 15, wherein the means for processing is to determine the future user pose based on Kalman filtering.

21. The apparatus of claim 15, wherein the means for processing is to determine the future user pose based on a time series of past user poses.

22. A method comprising:

determining a latency, the latency based on a time to display a rendered image;

determining, by executing at least one instruction with processor circuitry, a future user pose at a prediction interval, wherein the future user pose is based on input data, the input data includes a position and an orientation of a user, and the prediction interval is based on the latency;

rendering an image based on the future user pose; and transmitting the rendered image to a device.

23. The method of claim 22, wherein the input data corresponds to motion of a head of the user.

24. The method of claim 22, wherein the input data includes sensor data from an inertial measurement unit (IMU).

25. The method of claim 22, wherein the input data includes sensor data from a camera.

26. The method of claim 22, wherein the latency includes at least one of network latency, render latency, or display latency.

27. The method of claim 22, wherein the determining of the future user pose is based on Kalman filtering.

28. The method of claim 22, wherein the determining of the future user pose is based on previous user poses.

* * * * *